United States Patent
Antunes et al.

(10) Patent No.: US 9,662,820 B2
(45) Date of Patent: May 30, 2017

(54) PNEUMATICALLY DRIVEN, PIN VELOCITY CONTROLLED INJECTION MOLDING APPARATUS AND METHOD

(71) Applicant: Synventive Molding Solutions, Inc., Peabody, MA (US)

(72) Inventors: Sergio Ribeiro De Oliveira Antunes, Scottsdale, AZ (US); Zhuang Rui Tan, Peabody, MA (US); Mark Moss, Boxford, MA (US); Christopher Lee, Beverly, MA (US); Ling Feng, Zuzhou Industrial Park (CN); Vito Galati, Rowley, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 281 days.

(21) Appl. No.: 14/698,144

(22) Filed: Apr. 28, 2015

(65) Prior Publication Data

US 2015/0239161 A1     Aug. 27, 2015

Related U.S. Application Data

(63) Continuation of application No. PCT/US2013/075064, filed on Dec. 13, 2013, and a
(Continued)

(51) Int. Cl.
    *B29C 45/20* (2006.01)
    *B29C 45/77* (2006.01)
    (Continued)

(52) U.S. Cl.
    CPC .............. *B29C 45/77* (2013.01); *B29C 45/23* (2013.01); *B29C 45/281* (2013.01);
    (Continued)

(58) Field of Classification Search
    CPC .................. B29C 45/281; B29C 45/82; B29C 2045/1792; B29C 2045/822
    See application file for complete search history.

(56) References Cited

U.S. PATENT DOCUMENTS 2,012,248 A   8/1935  Rayfield
5,460,201 A  10/1995  Borcea et al.
(Continued)

FOREIGN PATENT DOCUMENTS

EP        1142686 A1    10/2001
WO    2014093849 A2     6/2014

OTHER PUBLICATIONS

Written Opinion of the Int'l. Preliminary Examining Authority mailed Feb. 3, 2015 in Int'l. Application No. PCT/US2014/019210.
(Continued)

*Primary Examiner* — James Sanders
(74) *Attorney, Agent, or Firm* — Polsinelli PC

(57) ABSTRACT

An injection molding apparatus comprising:
  a pneumatically driven actuator having a piston mounted within a fluid sealed chamber for slidable axial movement along or against an interior surface of the fluid sealed chamber via a non-elastomeric engagement or with a non-elastomeric material disposed between the piston and the interior surface of the fluid sealed chamber,
  the piston forming first and second drive chambers within the fluid sealed chamber, each drive chamber having respective fluid flow ports,
  a source of pressurized gas that generates gas flow at a selected maximum pressure or flow rate,
  a gas metering mechanism,
  a controller interconnected to the gas metering mechanism, the controller controllably moving the gas metering mechanism to selectable positions that correspond
(Continued)

to reduced pressures or reduced flow rates during the course of pin travel from the fully downstream gate closed position to the fully upstream gate open position.

13 Claims, 22 Drawing Sheets

Related U.S. Application Data continuation-in-part of application No. PCT/US2014/019210, filed on Feb. 28, 2014, and a continuation-in-part of application No. PCT/US2014/031000, filed on Mar. 18, 2014, and a continuation-in-part of application No. 14/567,369, filed on Dec. 11, 2014, and a continuation-in-part of application No. 14/567,308, filed on Dec. 11, 2014, now Pat. No. 9,623,598.

(51) Int. Cl.
*B29C 45/28* (2006.01)
*B29C 45/23* (2006.01)
*B29C 45/82* (2006.01)
*B29C 45/27* (2006.01)
*B29C 45/17* (2006.01)
*B29C 45/00* (2006.01)

(52) U.S. Cl.
CPC .......... *B29C 45/2806* (2013.01); *B29C 45/82* (2013.01); *B29C 45/2703* (2013.01); *B29C 2045/0032* (2013.01); *B29C 2045/0089* (2013.01); *B29C 2045/1792* (2013.01); *B29C 2045/2712* (2013.01); *B29C 2045/2817* (2013.01); *B29C 2045/2865* (2013.01); *B29C 2045/2872* (2013.01); *B29C 2045/822* (2013.01); *B29C 2945/7609* (2013.01); *B29C 2945/76076* (2013.01); *B29C 2945/76277* (2013.01); *B29C 2945/76381* (2013.01); *B29C 2945/76545* (2013.01); *B29C 2945/76598* (2013.01); *B29C 2945/76678* (2013.01); *B29C 2945/76755* (2013.01); *B29C 2945/76859* (2013.01); *B29C 2945/76933* (2013.01)

(56) References Cited

U.S. PATENT DOCUMENTS

| 6,589,039 | B1 | 7/2003 | Doughty et al. |
| 2002/0086086 | A1 | 7/2002 | Doyle et al. |
| 2012/0248652 | A1 | 10/2012 | Galati et al. |

OTHER PUBLICATIONS

Int'l. Preliminary Report on Patentability mailed Feb. 4, 2015 in Int'l. Application No. PCT/US2013/075064.
Int'l. Search Report and Written Opinion mailed Jun. 12, 2014 in Int'l. Application No. PCT/US2014/019210.
Int'l. Search Report and Written Opinion mailed Jul. 25, 2014 in Int'l. Application No. PCT/US2014/03100.
Int'l. Search Report and Written Opinion mailed Jul. 25, 2014 in Int'l. Application No. PCT/US2013/075064.

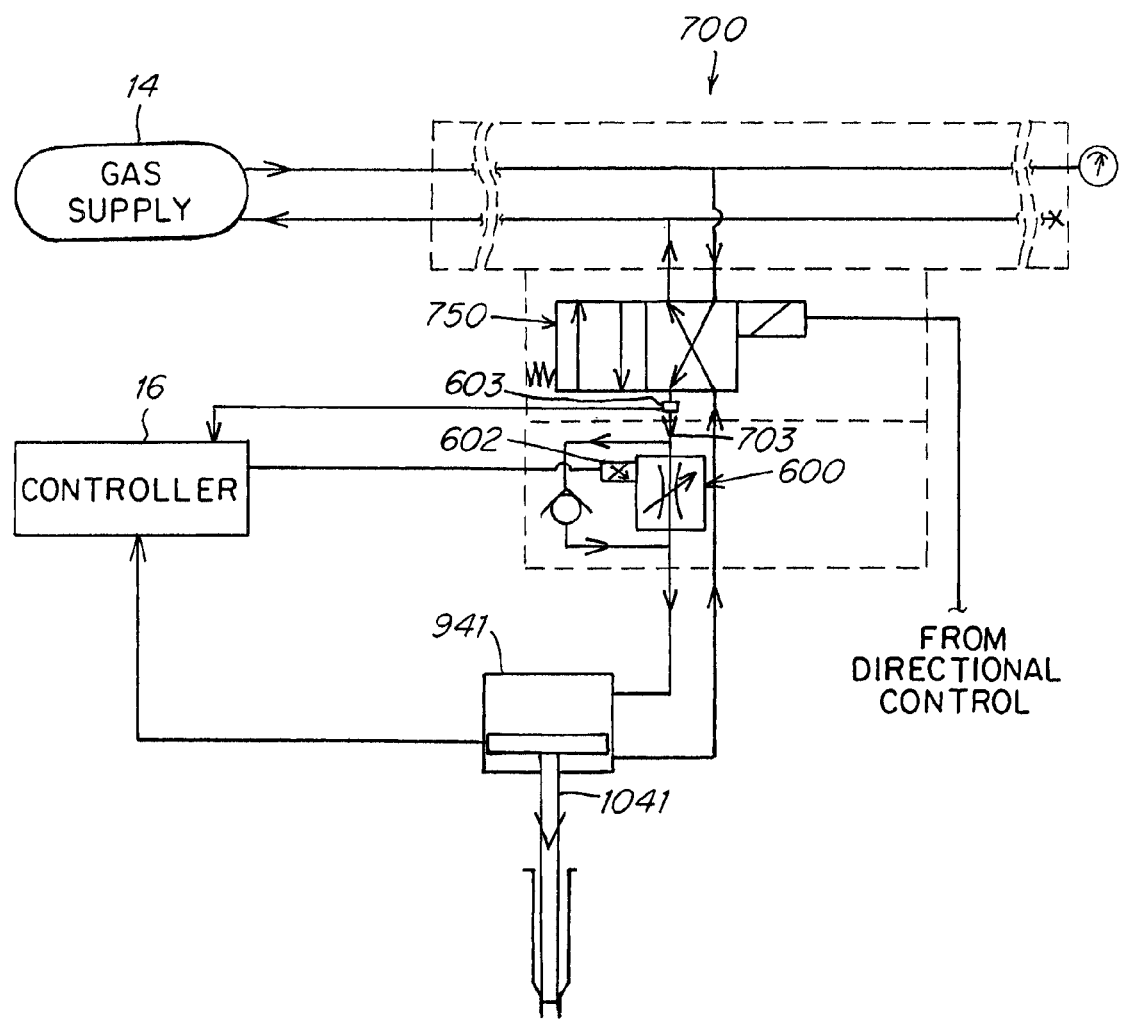
Fig. 2AAA

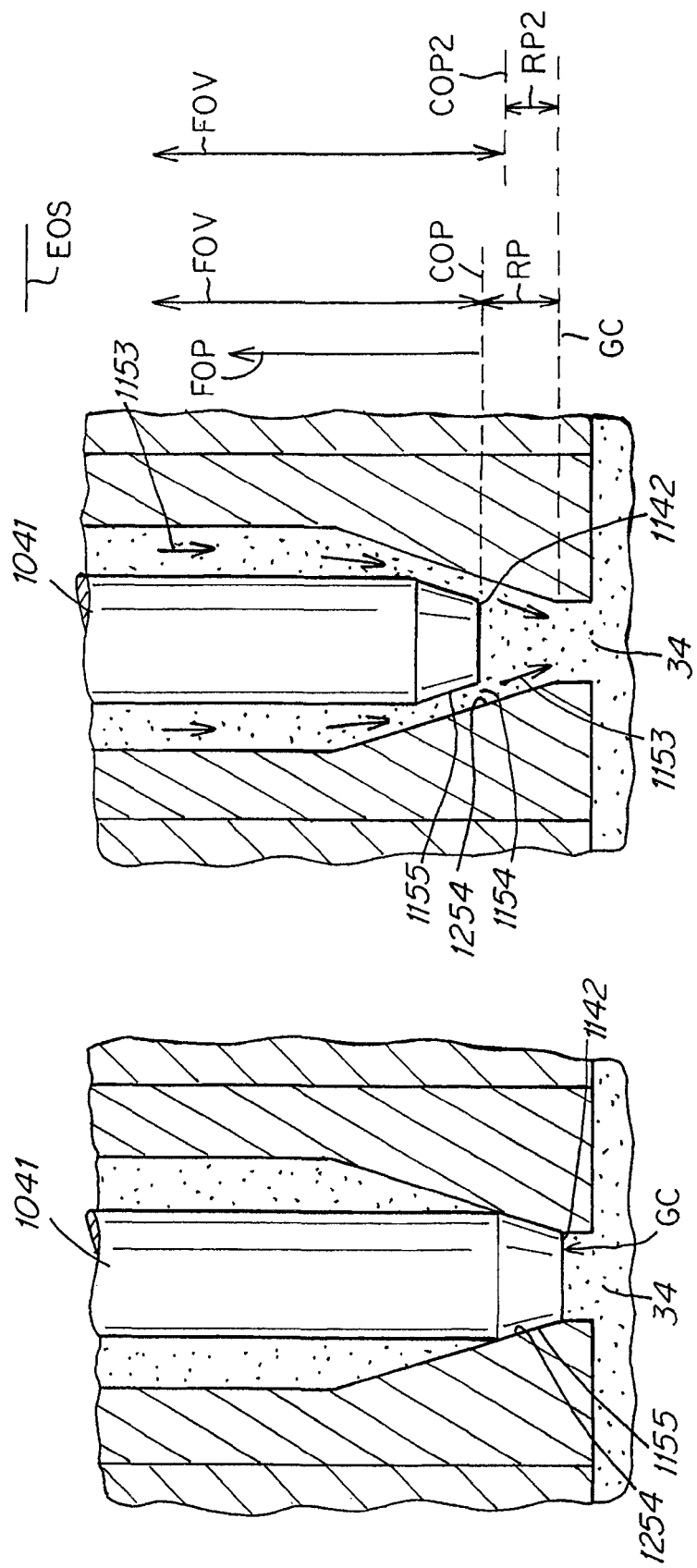

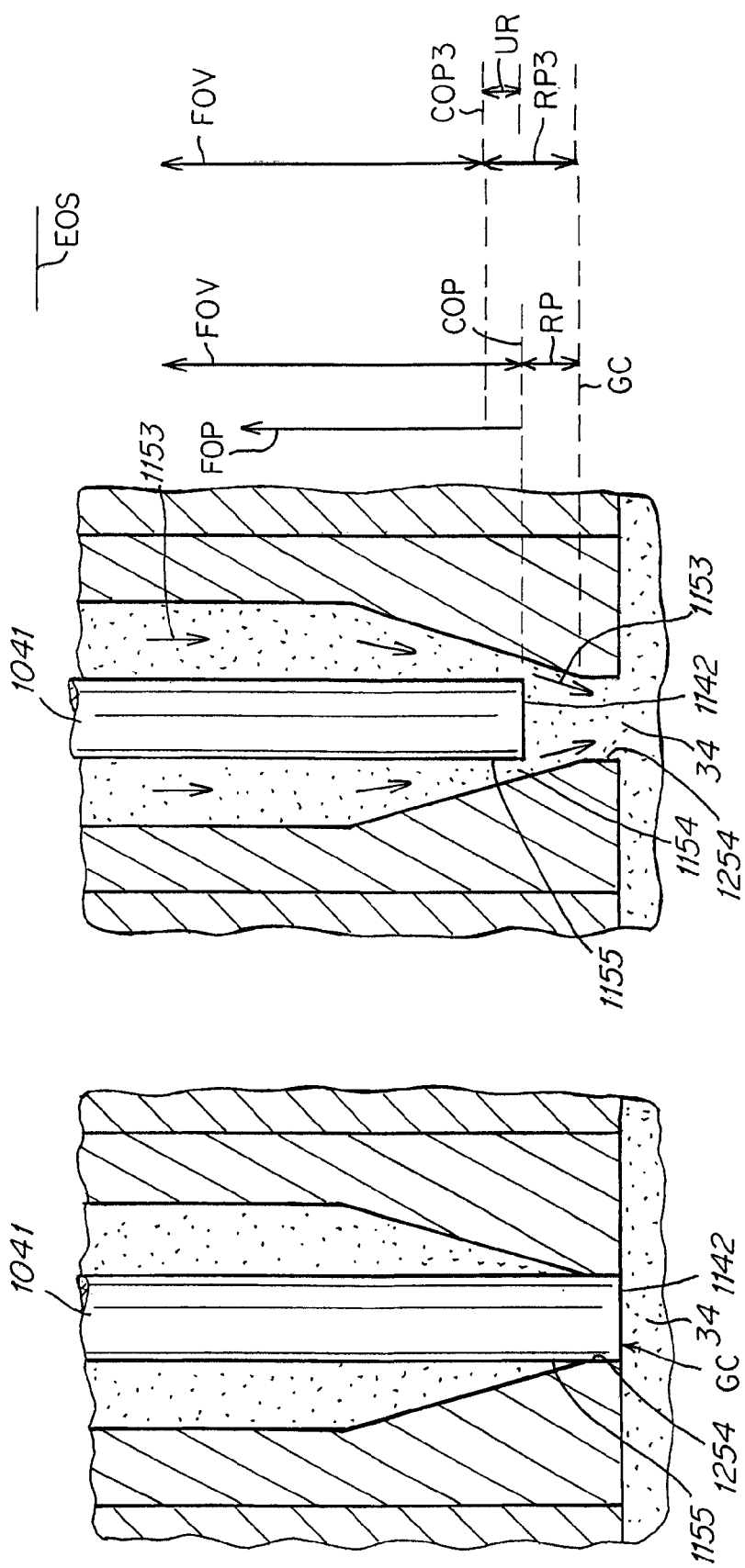

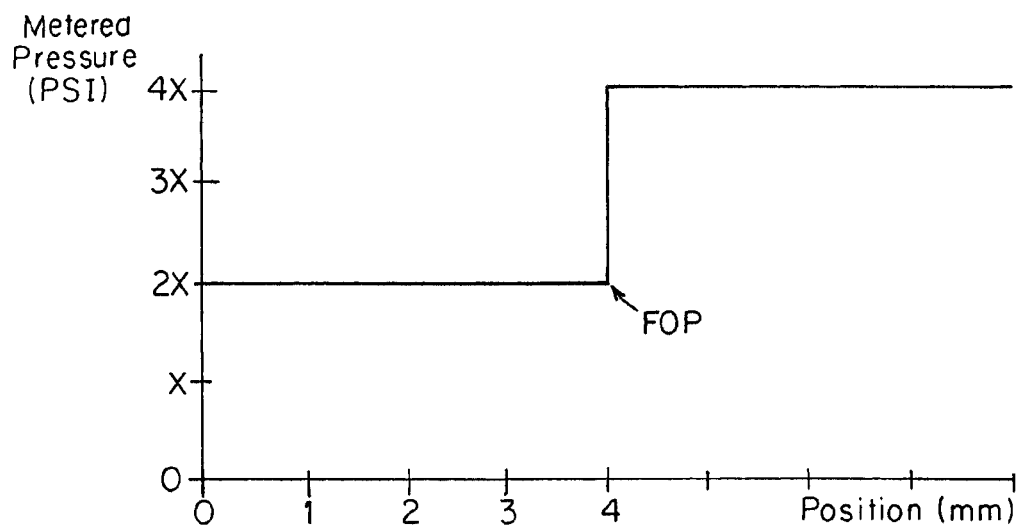
Fig. 5AA
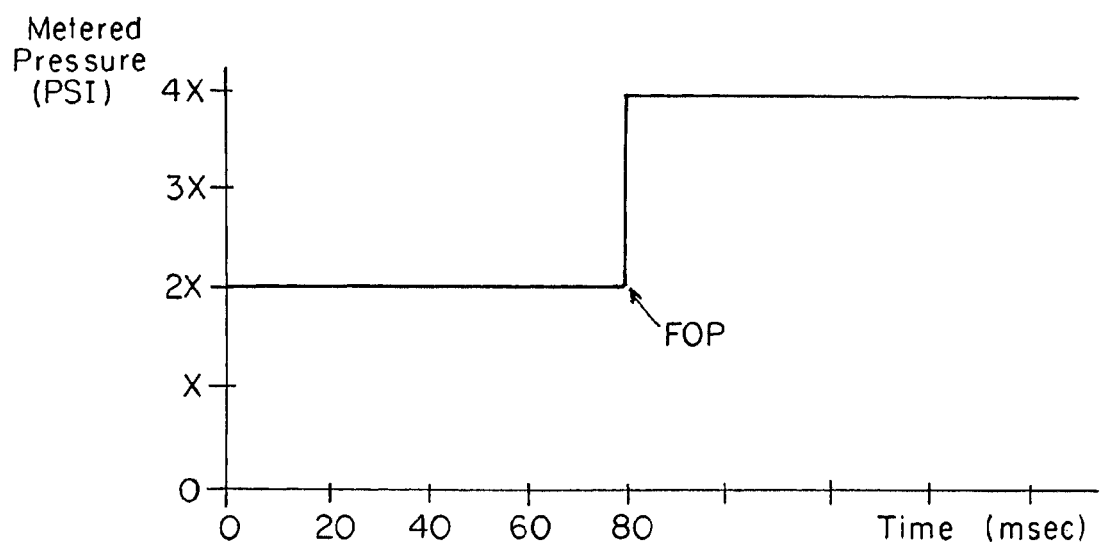
Fig. 5AAA

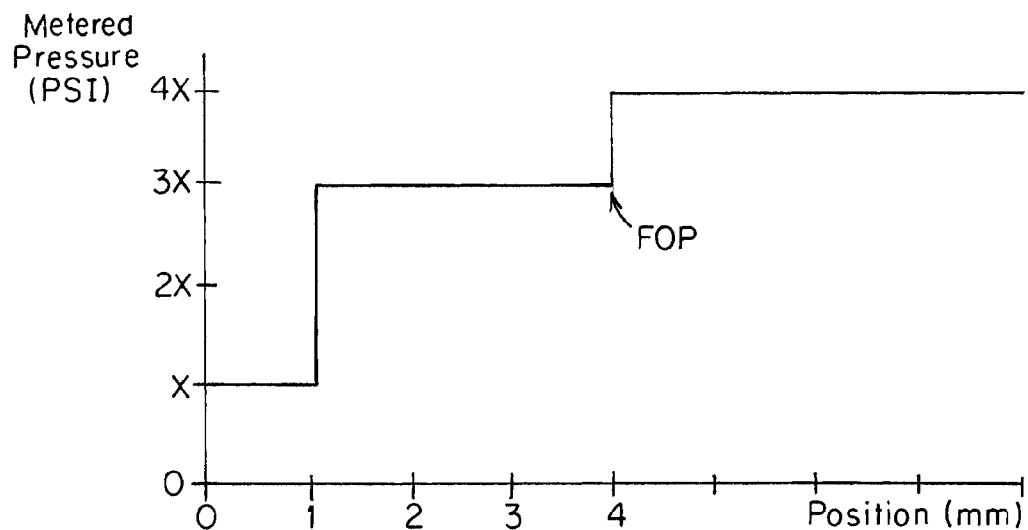
Fig. 5BB
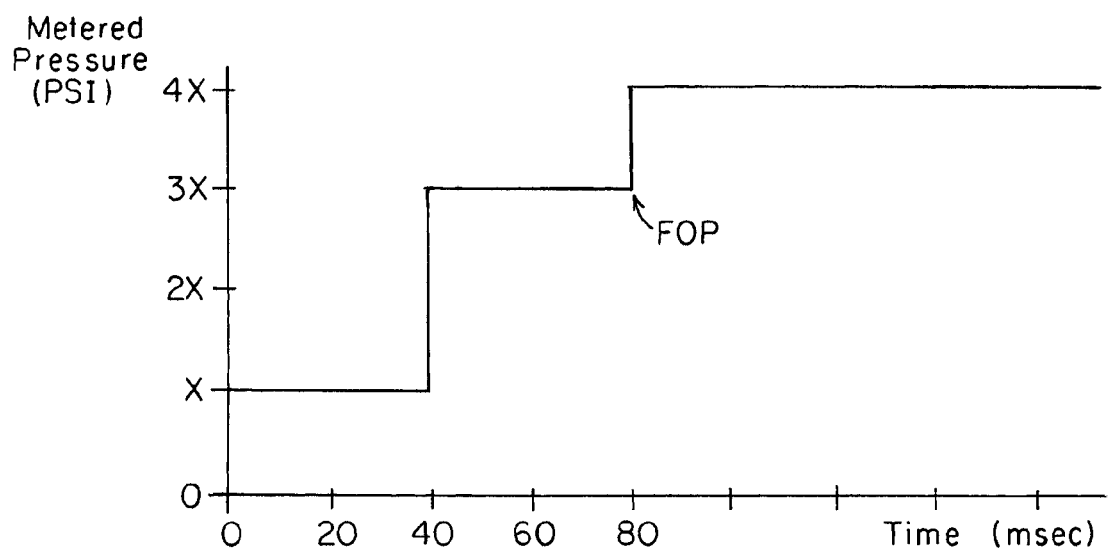
Fig. 5BBB

PNEUMATICALLY DRIVEN, PIN VELOCITY CONTROLLED INJECTION MOLDING APPARATUS AND METHOD

RELATED APPLICATIONS

This application is a continuation of and claims the benefit of priority to PCT/US2013/075064 filed Dec. 13, 2013 and is a continuation-in-part of and claims the benefit of priority to PCT/US2014/019210 filed Feb. 28, 2014 and is a continuation-in-part of and claims the benefit of priority to PCT/US2014/031000 filed Mar. 18, 2014, the disclosures of all of which are incorporated by reference as if fully set forth herein in their entirety. This application is also a continuation-in-part of and claims the benefit of priority to U.S. Ser. No. 14/567,369 filed Dec. 11, 2014 and is a continuation-in-part of and claims the benefit of priority to U.S. Ser. No. 14/567,308 filed Dec. 11, 2014, the disclosures of all of which are incorporated by reference as if fully set forth herein in their entirety.

The disclosures of all of the following are incorporated by reference in their entirety as if fully set forth herein: U.S. Pat. No. 5,894,025, U.S. Pat. No. 6,062,840, U.S. Pat. No. 6,294,122, U.S. Pat. No. 6,309,208, U.S. Pat. No. 6,287,107, U.S. Pat. No. 6,343,921, U.S. Pat. No. 6,343,922, U.S. Pat. No. 6,254,377, U.S. Pat. No. 6,261,075, U.S. Pat. No. 6,361,300 (7006), U.S. Pat. No. 6,419,870, U.S. Pat. No. 6,464,909 (7031), U.S. Pat. No. 6,599,116, U.S. Pat. No. 7,234,929 (7075US1), U.S. Pat. No. 7,419,625 (7075US2), U.S. Pat. No. 7,569,169 (7075US3), U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068) and U.S. application Ser. No. 10/101,278 filed Mar. 19, 2002 (7070).

BACKGROUND OF THE INVENTION

Injection molding systems have been developed having hydraulic fluid flow control mechanisms that control the movement of a valve pin over the course of an injection cycle to cause the pin to move either upstream or downstream over the course of injection cycle in order to raise or lower the rate of flow of fluid material to correspond to a predetermined profile of fluid flow rates for the injection cycle. A sensor can sense a condition of the injection fluid material or of the apparatus such as pin position and send a signal indicative of the sensed condition to a program contained in a controller that uses the signal as a variable input to control movement of the valve pin in accordance with the predetermined profile.

SUMMARY OF THE INVENTION

In one embodiment of the invention, the pneumatically driven piston and/or valve pin is controllably driven such that starting from the fully gate closed position (no material flow), the piston and valve pin are controllably driven upstream to a gate open, material flow position (at the beginning of the cycle) at an initial reduced velocity rate (less than maximum for the system) and then subsequently, at some predetermined time or pin position that occurs during the same cycle, the piston or pin is driven at a high velocity relative to the initial reduced velocity (typically maximum velocity) and then subsequently at some predetermined time or position of the pin that occurs during the same cycle drive the piston or pin is driven at another or the same reduced velocity relative to the high velocity. Such initial slow, intermediate high and final slow velocity of pin withdrawal facilitates removal of defects in the molded article.

In another embodiment of the invention, the pneumatically driven piston and/or valve pin is controllably driven such that starting from the fully gate closed position, the piston and valve pin are controllably driven upstream to a gate open, material flow position (at the beginning of the cycle) at an initial reduced velocity rate (less than maximum for the system) and then subsequently, at some predetermined time or pin position that occurs during the same cycle, the piston or pin is driven at a high velocity relative to the initial reduced velocity (typically maximum velocity) to the fully upstream position of the piston and valve pin at the end of the injection cycle. Such initial slow and subsequent high velocity of pin withdrawal protocol facilitates removal of defects in the molded article.

In another embodiment of the invention, the pneumatically driven piston and/or valve pin is controllably driven such that starting from the fully gate closed position, the piston and valve pin are controllably driven upstream from the gate closed position all the way to a fully upstream, material flow, end of cycle position at one or more reduced velocity rates (namely less than maximum velocity for the system). Such reduced velocity of pin withdrawal protocol facilitates removal of defects in the molded article.

In another embodiment of the invention, the pneumatically driven piston and/or valve pin is controllably driven such that starting from the fully upstream gate open position (maximum material flow) at the end of the upstream withdrawal portion of the cycle, the piston and valve pin are controllably driven downstream toward the gate closed position at an initial reduced velocity rate (less than maximum for the system) and then subsequently, at some predetermined time or pin position that occurs during the downstream close portion of the same cycle, the piston or pin is driven at a high velocity relative to the initial reduced velocity (typically maximum velocity) and then subsequently at some predetermined time or position of the pin that occurs during the same cycle the piston or pin is driven downstream to a fully gate closed position (no material flow) at another or the same reduced velocity relative to the high velocity. Such initial slow, intermediate high and final slow velocity of downstream, toward gate closed, pin movement facilitates removal of defects in the molded article In another embodiment of the invention, the pneumatically driven piston and/or valve pin is controllably driven such that starting from the fully upstream gate open position (maximum material flow) at the end of the upstream withdrawal portion of the cycle, the piston and valve pin are controllably driven downstream toward the gate closed position at an initial reduced velocity rate (less than maximum for the system) and then subsequently, at some predetermined time or pin position that occurs during the downstream gate close portion of the same cycle, the piston or pin is driven at a high velocity relative to the initial reduced velocity (typically maximum velocity) all the way to a gate closed (no material flow) position. Such initial slow and subsequent high velocity of downstream, toward gate closed, pin movement facilitates removal of defects in the molded article.

In another embodiment of the invention, the pneumatically driven piston and/or valve pin is controllably driven such that starting from the fully upstream gate open position (maximum material flow) at the end of the upstream withdrawal portion of the cycle, the piston and valve pin are controllably driven downstream toward the gate closed position at a reduced velocity rate (less than maximum for the system) all the way to a gate closed (no material flow) position. Such reduced velocity drive (relative to maximum) of the piston or pin downstream to the gate closed position facilitates removal of defects in the molded article.

In another aspect of the invention there is provided an injection molding apparatus for controlling velocity or volume of delivery of an injection fluid material to a cavity of a mold, the apparatus comprising:

a pneumatically driven actuator comprising a fluid sealed chamber in which a piston is mounted, the piston being interconnected to a valve pin, the piston forming first and second drive chambers within the fluid sealed chamber, each drive chamber having respective fluid flow ports, the piston and valve pin being drivable along a reciprocal path of axial travel having a stroke length that extends between a fully upstream gate open position where injection fluid material is enabled through a gate to a mold and a fully downstream gate closed position where the pin stops flow of injection material through the gate to the mold, a source of pressurized gas that generates gas flow at a selected maximum pressure or flow rate, a gas metering mechanism disposed between the source and one or the other or both of the fluid flow ports of the drive chambers, the gas metering mechanism being controllably movable to one or more selectable positions that vary rate of flow or pressure of the pressurized gas through one or the other of the fluid flow ports to one or more corresponding reduced pressures or reduced flow rates of the pressurized gas that are less than the maximum pressure or flow rate, a controller that includes programmable instructions that:

automatically controllably move the gas metering mechanism to one or more of the selectable positions that correspond to reduced pressures or reduced flow rates during the course of at least a selected portion of the stroke length from the fully downstream gate closed position to the fully upstream gate open position and, automatically controllably move the gas metering mechanism to one or more of the selectable positions that correspond to reduced pressures or reduced flow rates during the course of at least a selected portion of the stroke length from the fully upstream gate open position to the fully downstream gate closed position.

An injection molding apparatus for controlling velocity or volume of delivery of an injection fluid material to a cavity of a mold, the apparatus comprising:

a pneumatically driven actuator comprising a fluid sealed chamber in which a piston is mounted, the piston being interconnected to a valve pin, the piston being mounted within the fluid sealed chamber for slidable axial movement along or against an interior surface of the fluid sealed chamber via a non-elastomeric engagement or with a non-elastomeric material disposed between the piston and the interior surface of the fluid sealed chamber, the piston forming first and second drive chambers within the fluid sealed chamber, each drive chamber having respective fluid flow ports, the piston and valve pin being drivable along a reciprocal path of axial travel having a stroke length that extends between a fully upstream gate open position where injection fluid material is enabled through a gate to a mold and a fully downstream gate closed position where the pin stops flow of injection material through the gate to the mold, a source of pressurized gas that generates gas flow at a selected maximum pressure or flow rate, a gas metering mechanism disposed between the source and one or the other or both of the fluid flow ports of the drive chambers, the gas metering mechanism being controllably movable to one or more selectable positions that vary rate of flow or pressure of the pressurized gas through one or the other of the fluid flow ports to one or more corresponding reduced pressures or reduced flow rates of the pressurized gas that are less than the maximum pressure or flow rate, an adjuster interconnected to the gas metering mechanism, the adjuster being manually adjustable or being interconnected to a controller that includes programmable instructions that automatically controllably actuate the adjuster to move the gas metering mechanism to one or more of the selectable positions that correspond to reduced pressures or reduced flow rates during the course of at least a selected portion of the stroke length from the fully downstream gate closed position to the fully upstream gate open position.

The control mechanism can include programmable instructions that controllably move the gas metering mechanism to the one or more selectable positions corresponding to reduced pressures or reduced flow rates during the course of at least a selected portion of the stroke length when the pin travels from the fully upstream gate open position to the fully downstream gate closed position.

The gas metering mechanism can comprise a manually adjustable member that a user manually adjusts to a selectable position prior to initiation of an injection cycle, the manually adjustable member remaining in the selectable position throughout the injection cycle.

The gas metering mechanism is preferably remotely controllable to move automatically to one or more of the selectable positions, the controller being programmable to automatically direct the gas metering mechanism to move to the one or more selectable positions to controllably adjust or vary the rate of flow or the degree of pressure of gas flowing through one or the other or both of the fluid flow ports according to a preselected algorithm or program.

The controller can include instructions that direct the rate of flow or degree of pressure of gas to vary according to the expiration or elapse of a preselected amount of time or according to a detected position of the actuator or pin by a position sensor.

The control mechanism is typically programmed to move the metering mechanism to one or more selected positions that reduce the flow rate or pressure of the gas flowing through one or the other of the fluid flow ports beginning at a time when the valve pin or actuator are in the fully gate closed position for an initial period of time or upstream travel distance where the actuator or pin travel upstream along a portion of the stroke length and wherein the flow rate or pressure of the gas is increased on expiration of the initial period such that the actuator or valve pin continues to travel upstream at a higher velocity on expiration of the initial period.

The metering mechanism can comprise an electronically programmable flow restrictor.

The metering mechanism can comprise one or more shutters or adjustable aperture devices that are mounted on or to or are integral with the actuator and are adjustable to one or more selectable positions that controllably vary the degree of openness of the fluid flow ports.

The one or more shutters or adjustable aperture devices are preferably interconnected to one or more electric motors which are interconnected to the controller and controllable to selectively adjust the shutters or adjustable aperture devices to the one or more selectable positions.

In another aspect of the invention there is provided a method of controllably adjusting rate of travel or velocity of a pneumatic actuator piston or valve pin associated with the piston during an injection cycle in an injection molding apparatus, wherein the actuator comprises a fluid sealed chamber in which the piston is mounted forming first and second fluid sealed drive chambers having respective first and second fluid flow ports, the piston being interconnected to the valve pin, the piston and valve pin being drivable along a reciprocal path of axial travel having a stroke length that extends between a fully upstream gate open position where injection fluid material is enabled to flow through a gate to a mold cavity and a fully downstream gate closed position where the pin stops flow of injection material through the gate to the mold cavity, the method comprising:
interconnecting a source of pressurized gas that generates gas flow at a selected maximum pressure or flow rate to the fluid flow ports, preselecting a start time at which and a duration over the course of which the flow of the pressurized gas from the source is to be metered through the fluid flow ports during the course of the injection cycle,
metering the flow of pressurized gas from the source through the fluid flow ports at the preselected start time and for the selected duration at a rate of flow or pressure of the pressurized gas that is less than the maximum pressure or flow rate of the source.

The step of metering typically further comprises metering the flow of pressurized gas beginning when the valve pin is in the fully downstream gate closed position at the beginning of the injection cycle when the piston or pin are first withdrawn upstream.

The step of metering further typically further comprises selecting the duration of metering such that the gas is metered over a period of time or over the course of an upstream pin travel distance that is less than the stroke length or less than an amount of time required for the piston or pin to travel upstream the entire stroke length.

In another aspect of the invention there is provided a method of controllably adjusting rate of travel or velocity of a pneumatic actuator piston or valve pin associated with the piston during an injection cycle in an injection molding apparatus, wherein the actuator comprises a fluid sealed chamber in which the piston is mounted forming first and second fluid sealed drive chambers having respective first and second fluid flow ports, the piston being interconnected to the valve pin, the piston and valve pin being drivable along a reciprocal path of axial travel having a stroke length that extends between a fully upstream gate open position where injection fluid material is enabled to flow through a gate to a mold cavity and a fully downstream gate closed position where the pin stops flow of injection material through the gate to the mold cavity, the method comprising:
defining the injection cycle as an event that comprises a first cycle portion where the piston or pin is first driven upstream beginning from the fully downstream gate closed position to the fully upstream gate open position and a second cycle portion where piston or pin is driven back downstream to the fully downstream gate closed position,
interconnecting the piston or pin to a source of pressurized gas that generates gas flow at a selected maximum pressure or flow rate to the fluid flow ports,
driving the piston or pin with a metered portion of the maximum pressure or flow rate of gas generated by the source over the course of at least a portion of the first cycle portion, and
driving the piston or pin with a metered portion of the maximum pressure or flow rate of gas generated by the source over the course of at least a portion of the second cycle portion.

In another aspect of the invention there is provided, a method of controllably adjusting rate of travel or velocity of a pneumatic actuator piston or valve pin associated with the piston during an injection cycle in an injection molding apparatus, wherein the actuator comprises a fluid sealed chamber in which the piston is mounted forming first and second fluid sealed drive chambers having respective first and second fluid flow ports, the piston being interconnected to the valve pin, the piston and valve pin being drivable along a reciprocal path of axial travel having a stroke length that extends between a fully upstream gate open position where injection fluid material is enabled to flow through a gate to a mold cavity and a fully downstream gate closed position where the pin stops flow of injection material through the gate to the mold cavity, the method comprising:
defining the injection cycle as an event that comprises a first cycle portion where the piston or pin is first driven upstream beginning from the fully downstream gate closed position to the fully upstream gate open position and a second cycle portion where piston or pin is driven back downstream to the fully downstream gate closed position,
interconnecting the piston or pin to a source of pressurized gas that generates gas flow that can drive the piston or pin a maximum velocity,
driving the piston or pin with a metered portion of the pressurized gas generated by the source to drive the piston or pin at a selected velocity that is less than the maximum velocity over the course of at least a portion of the first cycle portion, and,
driving the piston or pin with a metered portion of the pressurized gas generated by the source to drive the piston or pin at a selected velocity that is less than the maximum velocity over the course of at least a portion of the second cycle portion.

In another aspect of the invention there is provided a method of performing an injection molding cycle in an injection molding apparatus comprising:
a manifold that receives an injection fluid mold material, the manifold having a delivery channel that delivers the injection fluid mold material under an injection pressure to a gate of a mold cavity,
a pneumatic actuator driven by a source of pressurized gas having a selected maximum pressure capable of driving the actuator at one or more selected maximum rates of travel, the pneumatic actuator comprising a pair of opposing first and second gas drive chambers,
the actuator being drivably interconnected to a valve pin having a tip end drivable upstream and downstream along a path of travel having a selected stroke length that extends between a first position where the tip end of the valve pin obstructs the gate to prevent the injection fluid material from flowing into the cavity, one or more second positions upstream of the first position and a selected fully upstream position that is upstream of the one or more second positions, the actuator being controllably drivable in a continuous upstream direction by a valve system that is controllably adjustable between an upstream start position where the tip end of the valve pin is disposed in the first position, one or more intermediate upstream drive rate positions and a high upstream drive rate position, the actuator being driven in a continuous upstream direction at one or more intermediate upstream rates of travel when the valve system is in the one or more intermediate upstream drive rate positions and at the one or more selected maximum rates of travel when the valve system is in the high upstream drive rate position, the actuator being further controllably drivable in a continuous downstream direction by the valve system, the valve system being controllably adjustable between one or more intermediate downstream drive rate positions and a high downstream drive rate position, the actuator being driven in a continuous downstream direction at one or more intermediate downstream rates of travel when the valve system is in the one or more intermediate downstream drive rate positions and at the one or more selected maximum rates of travel when the valve system is in the high downstream drive rate position, the method comprising:

beginning an injection cycle with the tip end of the valve pin in the first position and the valve system in the upstream start position, adjusting the valve system to operate at the one or more selected intermediate upstream drive rate positions to drive the tip end of the valve pin in a continuous upstream direction over either a selected portion or the entirety of the selected stroke length, adjusting the valve system when the tip end of the valve pin has reached the selected fully upstream position, to operate at the one or more intermediate downstream drive rate positions to drive the tip end of the valve pin in a continuous downstream direction over either a selected portion or the entirety of the selected stroke length.

Such a method preferably further comprises automatically adjusting the valve system to operate at the one or more intermediate downstream drive rate positions on sensing when the tip end of the valve pin has reached the selected fully upstream position or on expiration of a predetermined amount of time.

Such a method typically further comprises automatically adjusting the valve system to operate at the one more selected intermediate upstream drive rate positions and at the one or more intermediate downstream drive rate positions on sensing of the position of the valve pin at one or more preselected positions of the valve pin along the stroke length or upon expiration of preselected amounts of time The step of adjusting the valve system to operate at the one or more selected intermediate upstream drive rate positions can comprise operating at the one or more selected intermediate upstream drive rate positions over the entirety of the selected stroke length.

The step of adjusting the valve system to operate at the one or more intermediate downstream drive rate positions can comprise operating at the one or more selected intermediate downstream drive rate positions over the entirety of the selected stroke length.

The step of adjusting the valve system to operate at the one or more selected intermediate upstream drive rate positions can comprise adjusting the valve system to operate at a single intermediate upstream drive rate position.

The step of adjusting the valve system to operate at the one or more intermediate upstream drive rate positions can comprise manually adjusting the valve system to operate at the single intermediate upstream drive rate position prior to the step of beginning.

The step of adjusting the valve system to operate at the one or more selected intermediate downstream drive rate positions comprises adjusting the valve system to operate at a single intermediate downstream drive rate position.

The step of adjusting the valve system to operate at the one or more intermediate downstream drive rate positions comprises manually adjusting the valve system to operate at the single intermediate downstream drive rate position prior to the step of beginning.

Preferably, the first and second opposing gas drive chambers are each respectively sealably connected to respective first and second metering valves, wherein:

the step of adjusting the valve system to operate at the one or more selected intermediate upstream drive rate positions comprises adjusting one of the first and second metering valves, and the step of adjusting the valve system to operate at the one or more selected intermediate downstream drive rate positions comprises adjusting the other of the first and second metering valves.

The valve system is preferably interconnected to an electrical signal generating device operable to generate an electrical signal of controllably variable degree, the valve system being adjustable in position to increase or decrease the flow of pressurized gas to a degree that is proportional to the degree of electrical signal input by the electrical signal generating device to the valve system, the steps of adjusting the valve system comprising operating the electrical signal generating device to adjust the positions of the valve system.

Each of the start, intermediate drive rate and high drive rate positions of the valve system typically have a different degree of openness, the pressurized gas of the valve system driving the actuator and the valve pin at a rate that is approximately proportional to the degree of openness of the positions of the valve system, the one or more intermediate drive rate positions having a degree of openness that is less than the degree of openness of the high drive rate position.

The step of sensing in such a method can include sensing the position of the valve pin with a position sensor that automatically sends one or more signals indicative of the position of the tip end of the valve pin to a control mechanism that automatically adjusts the positions of the valve system in response to receipt of the one or more signals from the position sensor.

The valve system is preferably adjustable in position to a degree of openness that is approximately proportional to the degree of electrical signal input by the electrical signal generating device to the valve system, the steps of adjusting the valve system comprising operating the electrical signal generating device to controllably adjust the degree of electrical signal input to the valve system.

In such a method, the tip end of the valve pin typically restricts flow of the injection fluid along the entire length of the path of travel extending between the first position and the second position.

In another aspect of the invention there is provided an apparatus for controlling the rate of flow of fluid mold material from an injection molding machine to a mold cavity, the apparatus comprising:

a manifold that receives an injection fluid mold material, the manifold having a delivery channel that delivers the injection fluid mold material under an injection pressure to a gate of a mold cavity, a pneumatic actuator comprising first and second opposing gas drive chambers each respectively sealably connected to first and second metering valves, the actuator being driven by a source of pressurized gas having a selected maximum pressure capable of driving the actuator at one or more selected maximum rates of travel, the actuator being drivably interconnected to a valve pin having a tip end drivable upstream and downstream along a path of travel having a selected stroke length that extends between a first position where the tip end of the valve pin obstructs the gate to prevent the injection fluid material from flowing into the cavity, one or more second positions upstream of the first position and a selected fully upstream position that is upstream of the one or more second positions, the actuator being controllably drivable in a continuous upstream direction by controllable adjustment of the first metering valve between an upstream start position where the tip end of the valve pin is disposed in the first position, one or more intermediate upstream drive rate positions and a high upstream drive rate position, the actuator being driven in a continuous upstream direction at one or more intermediate upstream rates of travel when the first metering valve is in the one or more intermediate upstream drive rate positions and at the one or more selected maximum rates of travel when the first metering valve is in the high upstream drive rate position, the actuator being further controllably drivable in a continuous downstream direction by controllable adjustment of the second metering valve between one or more intermediate downstream drive rate positions and a high downstream drive rate position, the actuator being driven in a continuous downstream direction at one or more intermediate downstream rates of travel when the second metering valve is in the one or more intermediate downstream drive rate positions and at the one or more selected maximum rates of travel when the valve system is in the high downstream drive rate position, the apparatus further comprising a controller interconnected to the first and second metering valves, the controller including instructions that instruct the first and second metering valves to move between the one or more intermediate upstream drive rate positions and the one or more intermediate downstream drive rate positions according to an algorithm utilizing the signals indicative of the position of the pin sent to the controller.

In such an apparatus the controller can instruct the first metering valve to operate in the one or more intermediate upstream drive rate positions throughout the entirety of the selected stroke length.

The controller can instruct the second metering valve to operate in the one or more intermediate downstream drive rate positions throughout the entirety of the selected stroke length.

The controller can instruct the second metering valve to operate in the one or more intermediate downstream drive rate positions throughout the entirety of the selected stroke length.

The controller can instruct the first metering valve to operate in the one or more intermediate upstream drive rate positions throughout the entirety of the selected stroke length.

Such an apparatus can further comprise a position sensor that senses the position of the valve pin and sends signals indicative of the position of the pin to the controller.

The controller can include instructions that instruct the first and second metering valves to move between any two or more of the start position, the one or more intermediate upstream drive rate positions, the high upstream drive rate position, the one or more intermediate downstream drive rate positions and the high downstream drive rate position according to one or more signals indicative of preselected positions of the pin that are received by the controller from the position sensor.

The controller can includes instructions that instruct the first metering valve to move from the start position to the one or more intermediate upstream drive rate positions and subsequently from the one or more intermediate upstream drive rate positions to the high upstream drive rate position on receipt by the controller of a signal from the position sensor that is indicative of the valve pin having reached the second position.

The controller can includes instructions that instruct the second metering valve to move from the one or more intermediate downstream drive rate positions to the high downstream drive rate position on receipt by the controller of a signal from the position sensor that is indicative of the valve pin having reached a predetermined position upstream of the first position.

The apparatus preferably further comprises an electrical signal generating device interconnected to the valve system to controllably drive the first and second metering valves to selected degrees of openness, the electrical signal generating device generating an electrical signal of controllably variable degree of output, the first and second metering valves being adjustable in degree of openness that is approximately proportional to the degree of output of the electrical signal.

The positions of the first and second metering valves typically each have a different degree of openness, the actuator and valve pin being driven at a velocity that is proportional to the degree of openness of the positions of the valve system, the controller instructing the generation of an electrical signal that adjusts the valve system to a degree of openness that is proportional to a degree of output of the electrical signal, the controller being programmable to instruct the generation of one or more first electrical signals having one or more corresponding first selected degrees of output that moves the valve system to the one or more intermediate drive rate positions to drive the actuator at one or more first velocities in an upstream direction, the controller being programmed to instruct the generation of a second electrical signal when the controller receives a signal from the position sensor that the tip end of the valve pin has reached the second position, the second electrical signal having a second selected degree of output that moves the valve system to the high drive rate position that drives the actuator at a second velocity that is higher than the one or more first velocities.

The controller includes instructions that instruct the first and second metering valves to move between the one or more intermediate upstream drive rate positions and the one or more intermediate downstream drive rate positions according to one or more predetermined amounts or elapses of time.

In another aspect of the invention there is provided, an apparatus for controlling the rate of flow of fluid mold material from an injection molding machine to a mold cavity, the apparatus comprising:

a manifold that receives an injection fluid mold material, the manifold having a delivery channel that delivers the injection fluid mold material under an injection pressure to a gate of a mold cavity, a pneumatic actuator comprising first and second opposing gas drive chambers each respectively sealably connected to first and second metering valves, the actuator being driven by a source of pressurized gas having a selected maximum pressure capable of driving the actuator at one or more selected maximum rates of travel, the actuator being drivably interconnected to a valve pin having a tip end drivable upstream and downstream along a path of travel having a selected stroke length that extends between a first position where the tip end of the valve pin obstructs the gate to prevent the injection fluid material from flowing into the cavity, one or more second positions upstream of the first position and a selected fully upstream position that is upstream of the one or more second positions, the actuator being controllably drivable in a continuous upstream direction by controllable adjustment of the first metering valve between an upstream start position where the tip end of the valve pin is disposed in the first position, one or more intermediate upstream drive rate positions and a high upstream drive rate position, the actuator being driven in a continuous upstream direction at one or more intermediate upstream rates of travel when the first metering valve is in the one or more intermediate upstream drive rate positions and at the one or more selected maximum rates of travel when the first metering valve is in the high upstream drive rate position, the actuator being further controllably drivable in a continuous downstream direction by controllable adjustment of the second metering valve between one or more intermediate downstream drive rate positions and a high downstream drive rate position, the actuator being driven in a continuous downstream direction at one or more intermediate downstream rates of travel when the second metering valve is in the one or more intermediate downstream drive rate positions and at the one or more selected maximum rates of travel when the valve system is in the high downstream drive rate position, the first and second metering valves being manually adjustable prior to beginning of an injection cycle to select movement of the first metering valve during an injection cycle to the one or more intermediate upstream drive rate positions and movement of the second metering valve during the injection cycle to the one or more intermediate downstream drive rate positions.

Such an apparatus can further comprise first and second control valves interconnected respectively to the first and second metering valves, the first and second control valves being interconnected to a controller, the controller including instructions that controllably adjust the first and second control valves to bypass the first and second metering valves according to an algorithm utilizing at least one of a predetermined position of the valve pin or a predetermined amount of time.

The first and second control valves are typically respectively interconnected between the first and second gas drive chambers and the first and second metering valves.

In another aspect of the invention there is provided a method of performing an injection molding cycle in an injection molding apparatus comprising:

a manifold that receives an injection fluid mold material, the manifold having a delivery channel that delivers the injection fluid mold material under an injection pressure to a gate of a mold cavity, a pneumatic actuator driven by a source of pressurized gas having a selected maximum pressure capable of driving the actuator at one or more selected maximum velocities, the pneumatic actuator comprising a pair of opposing first and second gas drive chambers, the actuator being drivably interconnected to a valve pin having a tip end drivable upstream and downstream along a path of travel having a selected stroke length that extends between a first position where the tip end of the valve pin obstructs the gate to prevent the injection fluid material from flowing into the cavity, one or more second positions upstream of the first position and a selected fully upstream position that is upstream of the one or more second positions, the actuator being controllably drivable in a continuous upstream direction at one or more selectable reduced upstream velocities that are less than the one or more selected maximum velocities the actuator being controllably drivable in a continuous downstream direction at one or more selectable reduced downstream velocities that are less than the one or more selectable maximum velocities the method comprising:

beginning the injection cycle with the actuator in the first position, driving the actuator in the continuous upstream direction at the one or more selectable reduced upstream velocities over either a selected portion or the entirety of the selected stroke length for either a predetermined amount of time or according to position of the valve pin, driving the actuator in the continuous downstream direction at the one or more selectable reduced downstream velocities over either a selected portion or the entirety of the selected stroke length for either a predetermined amount of time or according to a position of the valve pin.

Such a method typically further comprises driving the actuator via a controller that includes instructions that automatically instruct the actuator to be driven at the one or more selectable reduced upstream velocities and at the one or more selectable reduced downstream velocities according to one or more signals indicative of preselected positions of the pin that are received by the controller from the position sensor or according to predetermined amounts or elapses of time.

In another aspect of the invention there is provided an apparatus for controlling the rate of flow of fluid mold material from an injection molding machine to a mold cavity, the apparatus comprising:

a manifold that receives an injection fluid mold material, the manifold having a delivery channel that delivers the injection fluid mold material under an injection pressure to a gate of a mold cavity, an electric actuator driven by an electrically powered motor capable of driving the actuator at one or more selected maximum velocities, the electric actuator being drivably interconnected to a valve pin having a tip end drivable upstream and downstream along a path of travel having a selected stroke length that extends between a first position where the tip end of the valve pin obstructs the gate to prevent the injection fluid material from flowing into the cavity, one or more second positions upstream of the first position and a selected fully upstream position that is upstream of the one or more second positions, the electric actuator being controllably drivable in a continuous upstream direction at one or more selectable reduced upstream velocities that are less than the one or more selected maximum velocities the actuator being controllably drivable in a continuous downstream direction at one or more selectable reduced downstream velocities that are less than the one or more selectable maximum velocities a controller interconnected to the electric actuator, the controller including a program that includes instructions for driving the actuator in the continuous upstream direction at the one or more selectable reduced upstream velocities over either a selected portion or the entirety of the selected stroke length for either a predetermined amount of time or according to position of the valve pin, the program including instructions for driving the actuator in the continuous downstream direction at the one or more selectable reduced downstream velocities over either a selected portion or the entirety of the selected stroke length for either a predetermined amount of time or according to a position of the valve pin.

In another aspect of the invention there is provided a method of performing an injection molding cycle in an injection molding apparatus comprising:

a manifold that receives an injection fluid mold material, the manifold having a delivery channel that delivers the injection fluid mold material under an injection pressure to a gate of a mold cavity, an electric actuator driven by an electrically powered motor capable of driving the actuator at one or more selected maximum velocities, the electric actuator being drivably interconnected to a valve pin having a tip end drivable upstream and downstream along a path of travel having a selected stroke length that extends between a first position where the tip end of the valve pin obstructs the gate to prevent the injection fluid material from flowing into the cavity, one or more second positions upstream of the first position and a selected fully upstream position that is upstream of the one or more second positions, the electric actuator being controllably drivable in a continuous upstream direction at one or more selectable reduced upstream velocities that are less than the one or more selected maximum velocities the electric actuator being controllably drivable in a continuous downstream direction at one or more selectable reduced downstream velocities that are less than the one or more selectable maximum velocities the method comprising:

beginning the injection cycle with the actuator in the first position, driving the electric actuator in the continuous upstream direction at the one or more selectable reduced upstream velocities over either a selected portion or the entirety of the selected stroke length for either a predetermined amount of time or according to position of the valve pin, driving the electric actuator in the continuous downstream direction at the one or more selectable reduced downstream velocities over either a selected portion or the entirety of the selected stroke length for either a predetermined amount of time or according to a position of the valve pin.

Such a method preferably further comprises driving the electric actuator via a controller that includes instructions that automatically instruct the actuator to be driven at the one or more selectable reduced upstream velocities and at the one or more selectable reduced downstream velocities according to one or more signals indicative of preselected positions of the pin that are received by the controller from the position sensor or according to predetermined amounts or elapses of time.

BRIEF DESCRIPTION OF THE DRAWINGS

The above and further advantages of the invention may be better understood by referring to the following description in conjunction with the accompanying drawings in which:

FIG. 2AA is a schematic cross-sectional view of a pneumatic valve and restrictor configuration used in the system of FIG. 1 showing a metering restriction valve 600 disposed in the drive fluid flow line that interconnects the directional valve and the upper fluid chamber of the piston, and showing a pressure sensor connected to the controller and disposed in and sensing the pressure of metered pneumatic drive fluid as it exits the metering restrictor valve 600 and flow toward the directional valve during the withdrawal or upstream-cycle of the actuator 941.

FIG. 2AAA is a schematic cross-sectional view of the FIG. 2A configuration showing the direction of flow of drive fluid during the closing or downstream-cycle of the actuator 941.

FIGS. 3A-3B show tapered end valve pin positions at various times and positions between a starting closed position as in FIG. 3A and various upstream opened positions, RP representing a selectable path length over which the velocity of withdrawal of the pin upstream from the gate closed position to an open position is reduced (via a controllable flow restrictor) relative to the velocity of upstream movement that the valve pin would normally have over the uncontrolled velocity path FOV when the pneumatic pressure is normally at full pressure and pin velocity is at its maximum.

FIGS. 4A-4B show a system having a valve pin that has a cylindrically configured tip end, the tips ends of the pins being positioned at various times and positions between a starting closed position as in FIG. 4A and various upstream opened positions, RP wherein RP represents a path of selectable length over which the velocity of withdrawal of the pin upstream from the gate closed position to an open position is reduced (via a controllable flow restrictor or electric actuator) relative to the velocity of upstream movement that the valve pin would normally have over the uncontrolled velocity path FOV when the pneumatic pressure of a pneumatic actuator is normally at full pressure and pin velocity is at its maximum.

FIG. 5AA shows a plot corresponding to the velocity versus position plot of FIG. 5A of the metered pressure of drive fluid as sensed exiting metering restrictor valve 600 (in a configuration such as shown in FIG. 2A or 2C) versus upstream position of travel of the valve pin 1041 of actuator 941 beginning from a fully closed position at position zero where the.

FIG. 5AAA shows a plot also corresponding to the velocity versus position plot of FIG. 5A of the metered pressure of drive fluid as sensed exiting metering restrictor valve 600 (in a configuration such as shown in FIG. 2A or 2C) versus time of travel of the valve pin 1041 of actuator 941 beginning from a fully closed position at time zero.

FIG. 5BB shows a plot corresponding to the velocity versus position plot of FIG. 5B of the metered pressure of drive fluid as sensed exiting metering restrictor valve 600 (in a configuration such as shown in FIG. 2A or 2C) versus upstream position of travel of the valve pin 1041 of actuator 941 beginning from a fully closed position at position zero.

FIG. 5BBB shows a plot also corresponding to the velocity versus position plot of FIG. 5B of the metered pressure of drive fluid as sensed exiting metering restrictor valve 600 (in a configuration such as shown in FIG. 2A or 2C) versus time of travel of the valve pin 1041 of actuator 941 beginning from a fully closed position at time zero.

DETAILED DESCRIPTION

FIGS. 1-6D show embodiments of apparatuses according to the invention using a generic metering or restrictor valve 600. FIG. 7A-8C show embodiments of the invention that use a specific example of a pneumatic restrictor valve comprised of a motor 2010, 2012 that controllably rotates a drive fluid (typically air) delivery tube to controllably vary the volume and rate of flow of pneumatic fluid to a pneumatic actuator. In general, the control protocols described with reference to FIGS. 1-6D for varying the velocity or pin withdrawal rate of the valve pin are applicable to use of the assemblies described and shown with reference to FIGS. 7A-8C.

Figure 1:
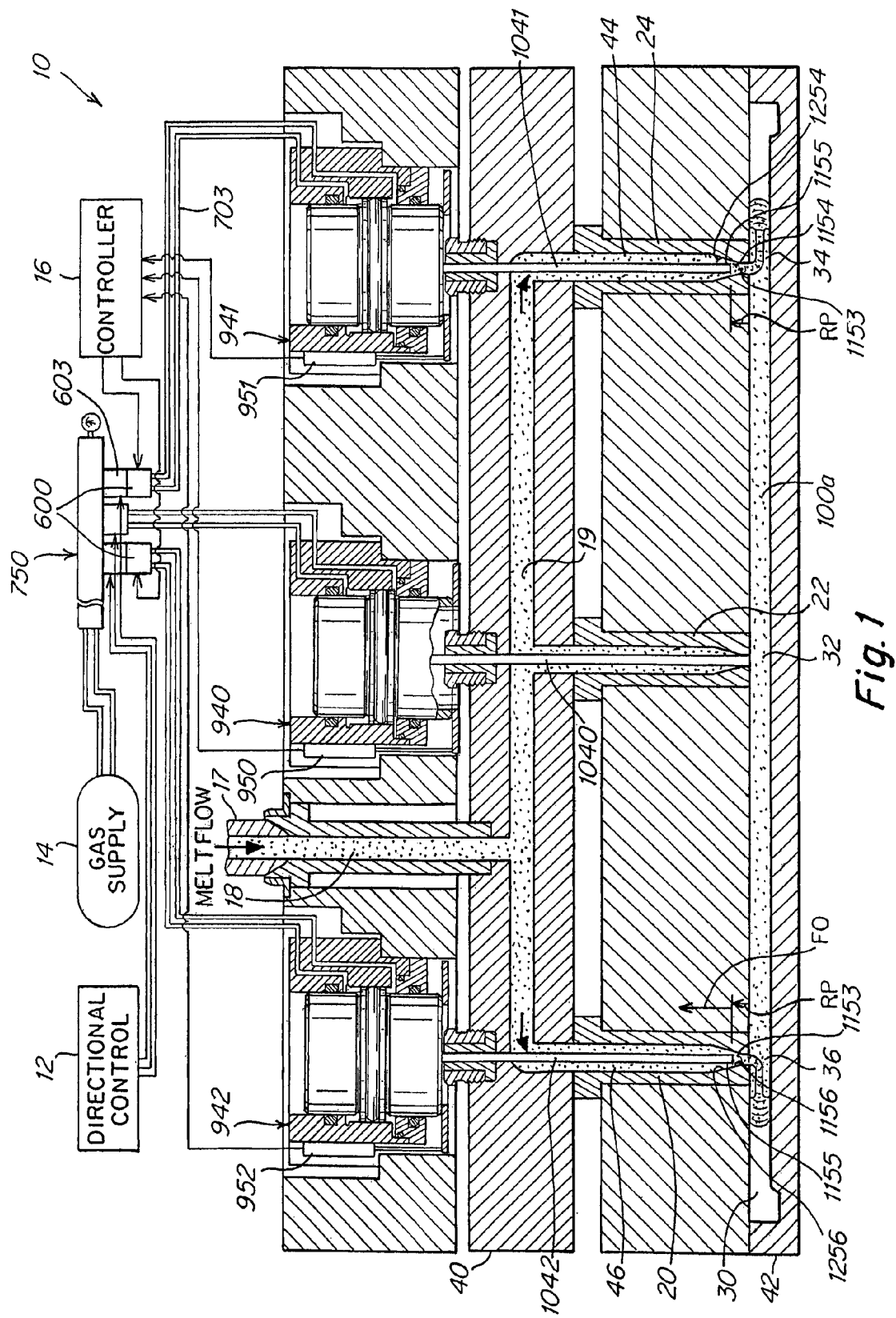
FIG. 1 is a schematic of one embodiment of the invention showing a pair of sequential gates showing a first gate entering the center of a cavity having been opened and shown closed such that a first shot of fluid material has entered the cavity and traveled past the position of a second sequential gate, the second gate shown being open with its valve pin having traveled along an upstream restricted flow path RP allowing a second sequential shot of fluid material to flow into and merge with the first shot of material within the cavity.

FIG. 1 shows a pneumatically driven system 10 with a central nozzle 22 feeding molten material from an injection molding machine through a main inlet 18 to a distribution channel 19 of a manifold 40. The distribution channel 19 commonly feeds three separate nozzles 20, 22, 24 which all commonly feed into a common cavity 30 of a mold 42. One of the nozzles 22 is controlled by actuator 940 and arranged so as to feed into cavity 30 at an entrance point or gate that is disposed at about the center 32 of the cavity. As shown, a pair of lateral nozzles 20, 24 feed into the cavity 30 at gate locations that are distal 34, 36 to the center gate feed position 32.

Figure 1A:
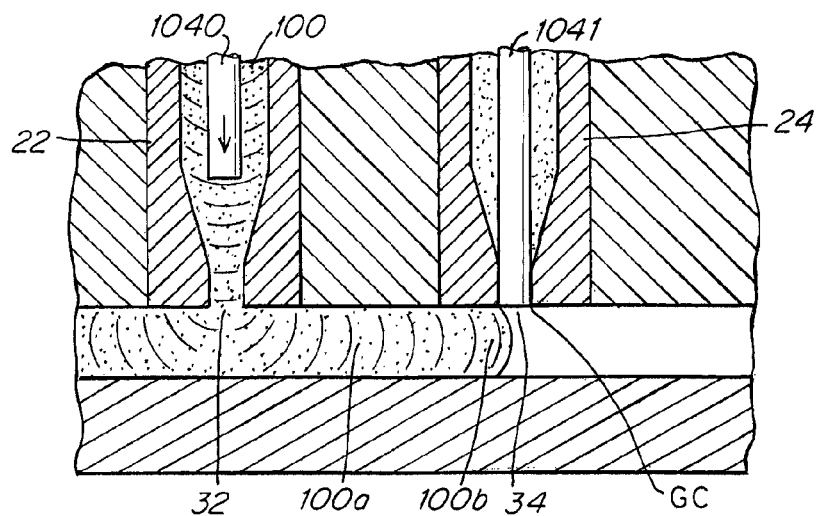
FIGS. 1A-1E are schematic cross-sectional close-up views of the center and one of the lateral gates of the FIG. 1 apparatus showing various stages of the progress of injection.
Figure 1B:
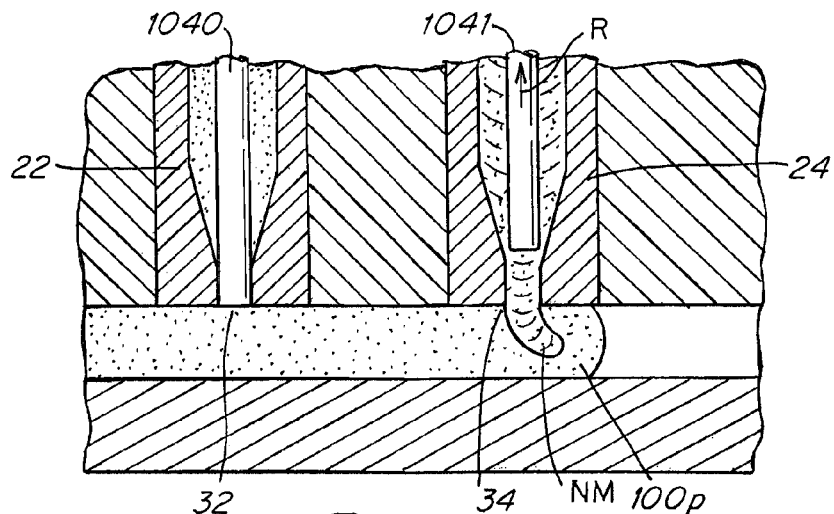
Figure 1C:
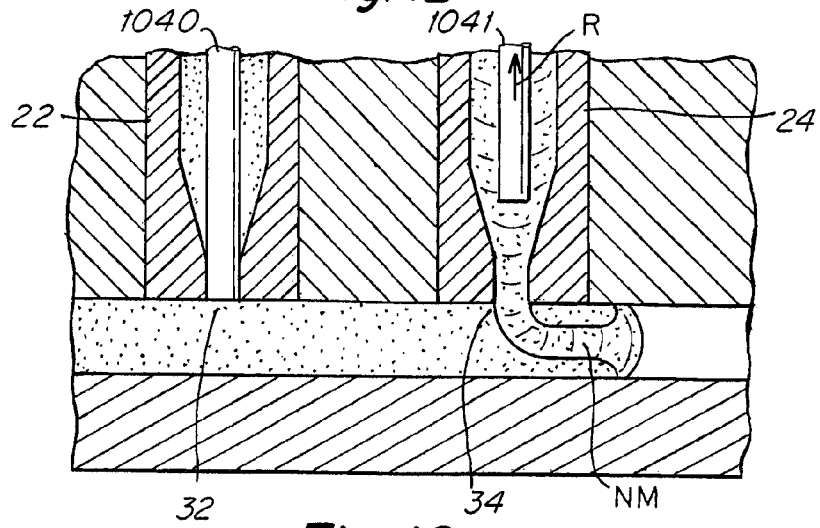

As shown in FIGS. 1, 1A the injection cycle is a cascade process where injection is effected in a sequence from the center nozzle 22 first and at a later predetermined time from the lateral nozzles 20, 24. As shown in FIG. 1A the injection cycle is started by first opening the pin 1040 of the center nozzle 22 and allowing the fluid material 100 (typically polymer or plastic material) to flow up to a position the cavity just before 100b the distally disposed entrance into the cavity 34, 36 of the gates of the lateral nozzles 24, 20 as shown in FIG. 1A. After an injection cycle is begun, the gate of the center injection nozzle 22 and pin 1040 is typically left open only for so long as to allow the fluid material 100b to travel to a position just past 100p the positions 34, 36. Once the fluid material has travelled just past 100p the lateral gate positions 34, 36, the center gate 32 of the center nozzle 22 is typically closed by pin 1040 as shown in FIGS. 1B, 1C, 1D and 1E. The lateral gates 34, 36 are then opened by upstream withdrawal of lateral nozzle pins 1041, 1042 as shown in FIG. 1B-1E. As described below, the rate of upstream withdrawal or travel velocity of lateral pins 1041, 1042 is controlled as described below.

In alternative embodiments, the center gate 32 and associated actuator 940 and valve pin 1040 can remain open at, during and subsequent to the times that the lateral gates 34, 36 are opened such that fluid material flows into cavity 30 through both the center gate 32 and one or both of the lateral gates 34, 36 simultaneously.

When the lateral gates 34, 36 are opened and fluid material NM is allowed to first enter the mold cavity into the stream 102p that has been injected from center nozzle 22 past gates 34, 36, the two streams NM and 102p mix with each other. If the velocity of the fluid material NM is too high, such as often occurs when the flow velocity of injection fluid material through gates 34, 36 is at maximum, a visible line or defect in the mixing of the two streams 102p and NM will appear in the final cooled molded product at the areas where gates 34, 36 inject into the mold cavity. By injecting NM at a reduced flow rate for a relatively short period of time at the beginning when the gate 34, 36 is first opened and following the time when NM first enters the flow stream 102p, the appearance of a visible line or defect in the final molded product can be reduced or eliminated.

Figure 5A:
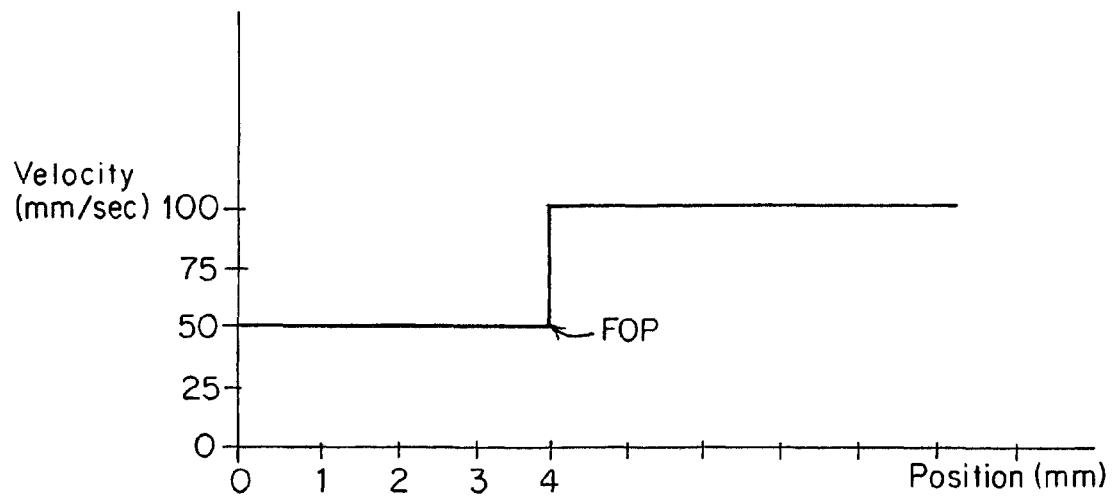
FIGS. 5A-5D are a series of plots of pin velocity versus position each plot representing a different example of the opening of a gate lateral to a central gate via continuous upstream withdrawal of a valve pin at one rate or set of rates over an initial flow path RP and at another higher rate or set of rates of upstream withdrawal of the valve pin beginning at a pin position of FOP and beyond when the fluid material flow is typically at a maximum unrestricted rate of flow through the open gate without any restriction or obstruction from the tip end of the pin.

The rate or velocity of upstream withdrawal of pins 1041, 1042 starting from the closed position is controlled via controller 16, FIGS. 1, 2 which controls the rate and direction of flow of pneumatic fluid from the drive system 700 to the actuators 940, 941, 942. As discussed in detail below, a predetermined profile of metered drive fluid pressure versus position of the valve pin or actuator piston (examples of which are shown in FIGS. 5AA, 5BB) or metered drive fluid pressure versus elapsed time (examples of which are shown in FIGS. 5AAA, 5BBB) is input into the controller as the basis for controlling withdrawal of the valve pin(s) 1041 et al. at a reduced velocity relative to one or more selected higher velocities of withdrawal. The higher velocity is typically selected to be the highest velocity at which the system is capable of driving the actuators. The controller 16 receives a signal in real time from a pressure sensor 603 (or 605, 607) disposed in the drive fluid line communicating with the exit of the metering valve 600, the signal being indicative of the reduced drive fluid pressure in line 703 (or 705, 707). The controller 16 instructs the valve 600 to move to a degree of openness that causes the fluid pressure in the line to match the pressure of the predetermined profile at any given point in time or pin position along the pressure versus time profile (e.g. FIG. 5AAA or 5BBB) or pressure versus position profile (FIG. 5AA or 5BB. The pressure in the exit line of the metering valve 600 is proportional and corresponds to the velocity of withdrawal movement of the actuator 941 (940, 942) and associated valve pin 1041 (1040, 1042).

A "controller," as used herein, refers to electrical and electronic control apparati that comprise a single box or multiple boxes (typically interconnected and communicating with each other) that contain(s) all of the separate electronic processing, memory and electrical signal generating components that are necessary or desirable for carrying out and constructing the methods, functions and apparatuses described herein. Such electronic and electrical components include programs, microprocessors, computers, PID controllers, voltage regulators, current regulators, circuit boards, motors, batteries and instructions for controlling any variable element discussed herein such as length of time, degree of electrical signal output and the like. For example a component of a controller, as that term is used herein, includes programs, controllers and the like that perform functions such as monitoring, alerting and initiating an injection molding cycle including a control device that is used as a standalone device for performing conventional functions such as signaling and instructing an individual injection valve or a series of interdependent valves to start an injection, namely move an actuator and associated valve pin from a gate closed to a gate open position. In addition, although fluid driven actuators are employed in typical or preferred embodiments of the invention, actuators powered by an electric or electronic motor or drive source can alternatively be used as the actuator component.

Figure 2A:
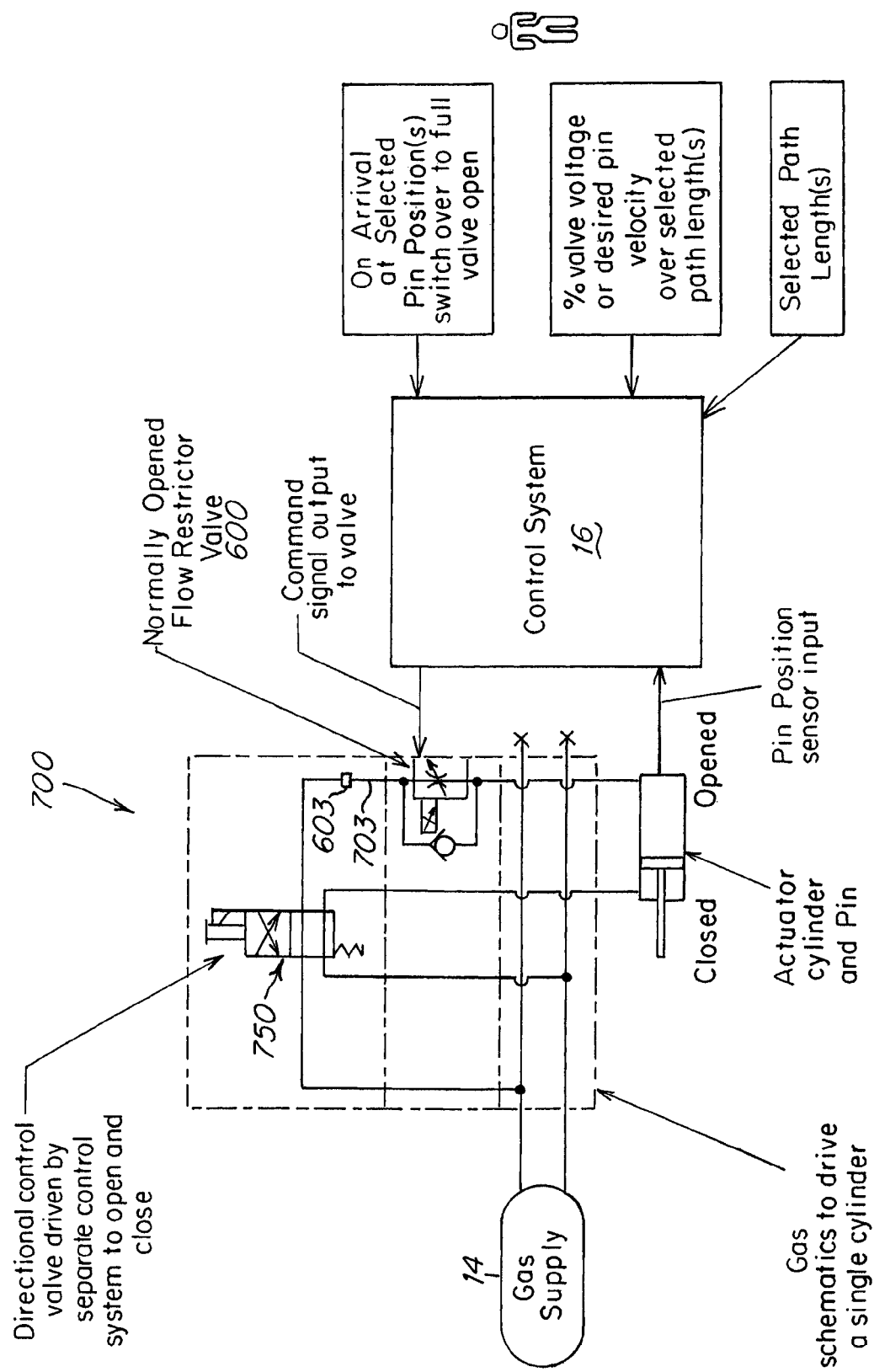
FIG. 2A is a schematic of one embodiment of the invention showing generically a pneumatically actuated valve pin in which at least one port of the actuator is connected to a flow restrictor 600 so as to restrict the flow of pneumatic drive fluid and slow the opening of the valve pin by a selected lessening of pin opening velocity by use of a controller interconnected to the flow restrictor, the controller enabling the user to select a percentage of predetermined full open position velocity that the pneumatic drive supply to the actuator normally operates at full open velocity drive fluid pressure, the controller instructing the restrictor valve to operate at less than full open velocity up until the valve pin reaches a predetermined upstream position at which point a position sensor signals the controller and the controller instructs the restrictor valve to open to a full open full velocity degree of openness position.
Figure 2A:
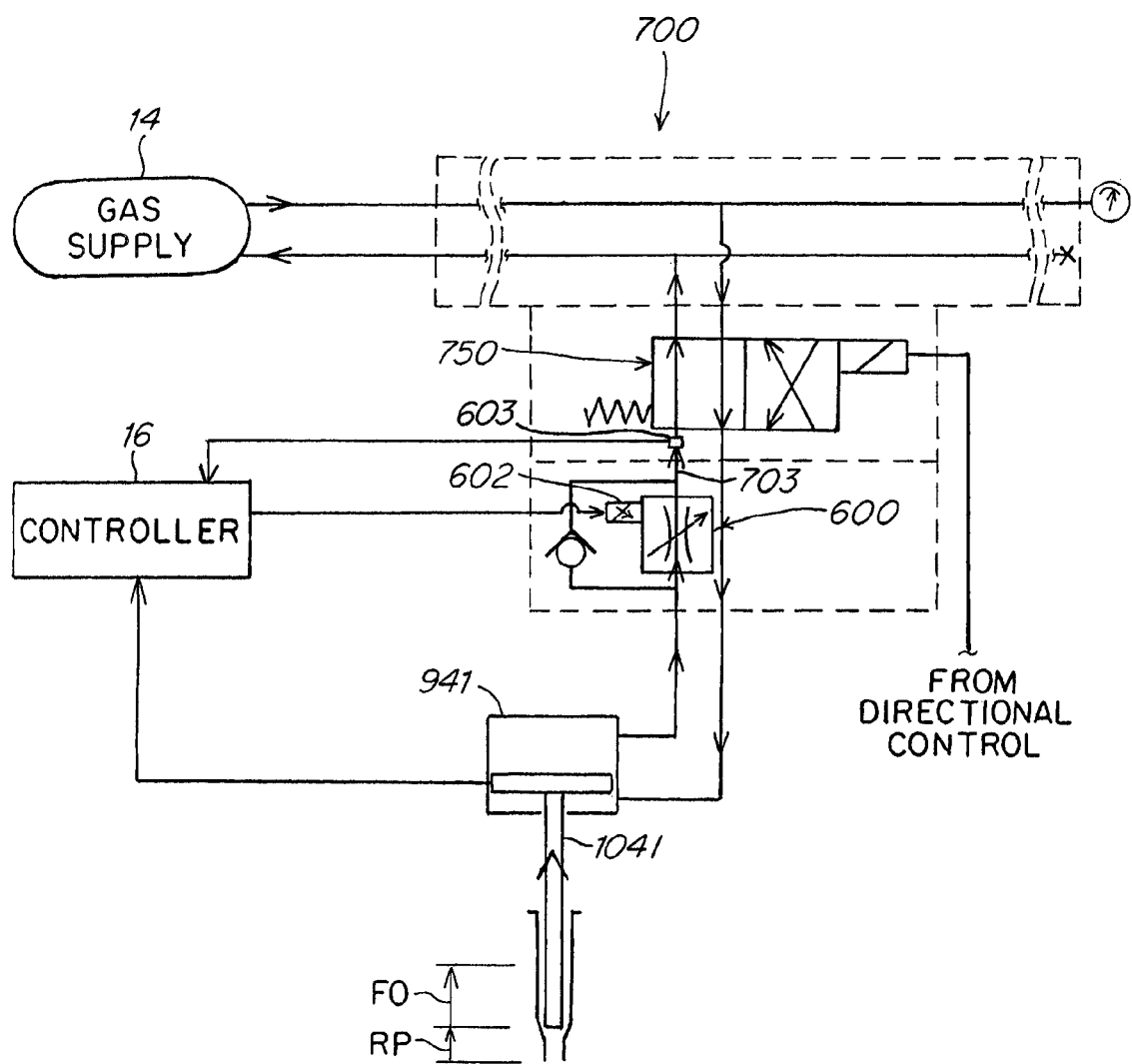
Figure 2B:
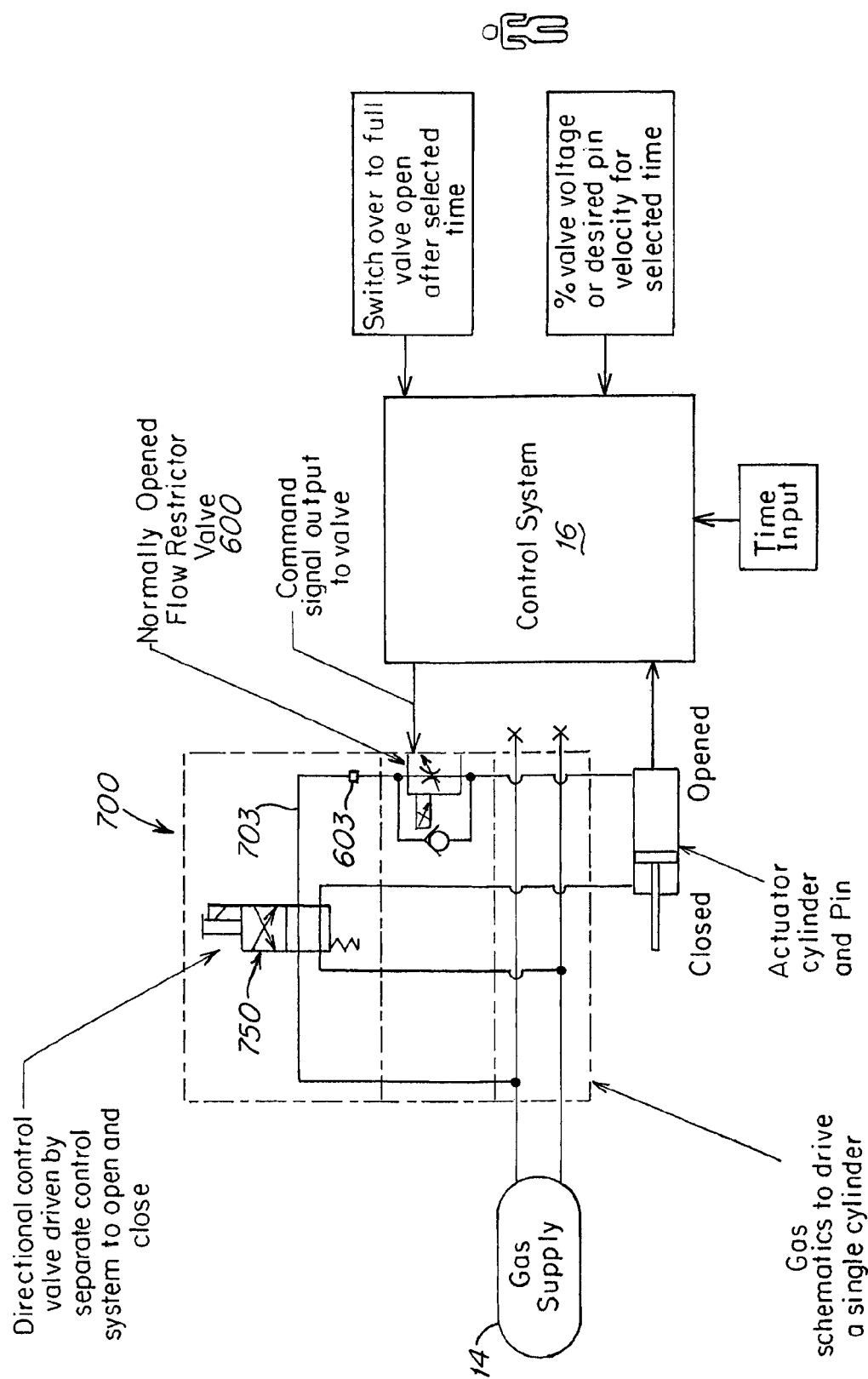
FIG. 2B is a schematic of an alternative embodiment to the FIG. 2A system showing generically a pneumatically actuated valve and its interconnection to the pneumatic system and the control system for operating the restrictor valve 600 to cause the valve pin to withdraw at the beginning of a cycle at a predetermined reduced velocity for a predetermined amount of time subsequent to which the control system instructs the restrictor valve to open to a full open full velocity degree of openness position.
Figure 2C:
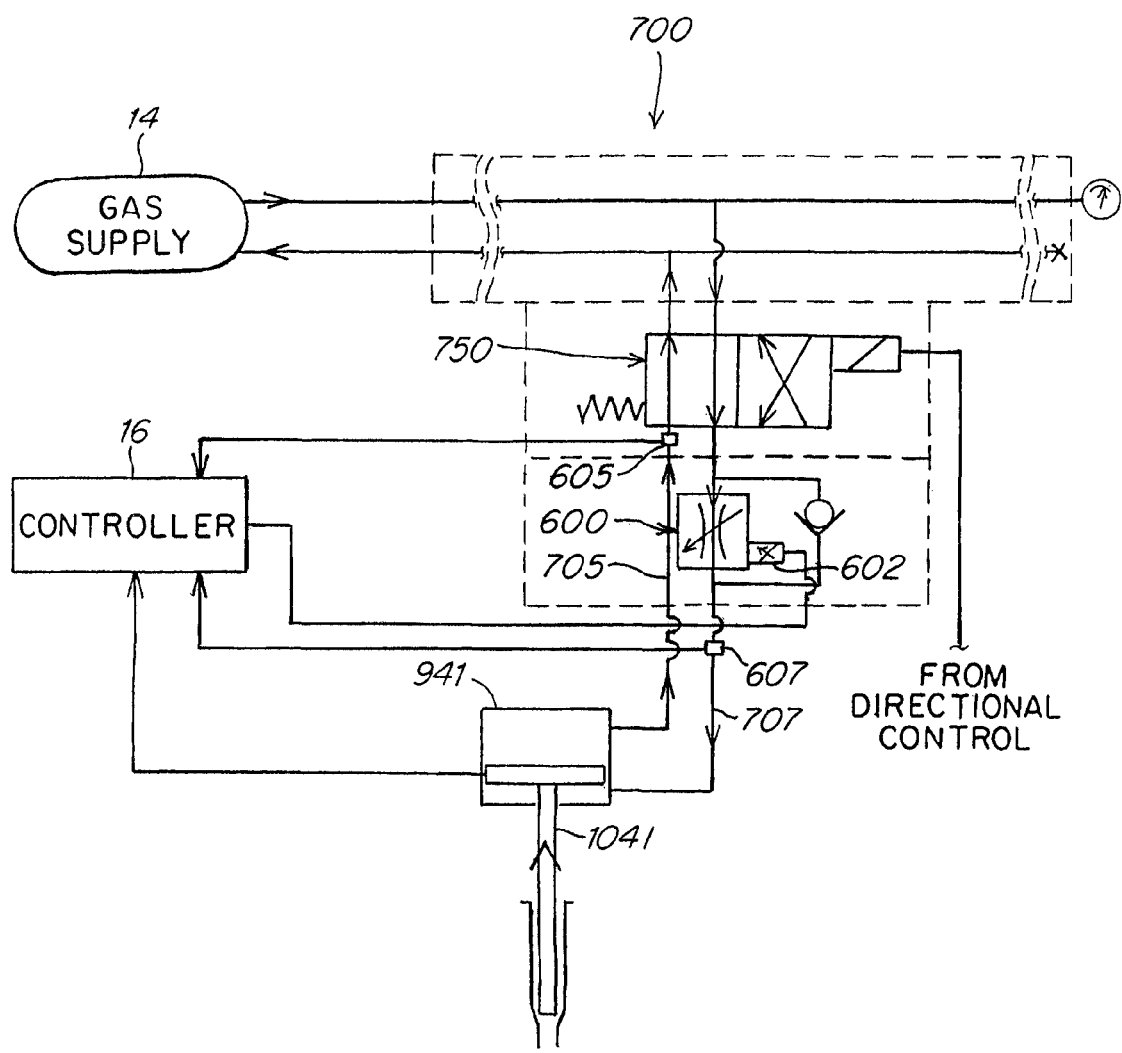
FIG. 2C is a schematic cross-sectional view of another pneumatic valve and restrictor configuration that can be used in the system of FIG. 2A or 2B showing the metering restrictor valve 600 disposed in the drive fluid flow line that interconnects the directional valve and the lower piston fluid chamber and further showing alternative possible locations for placement of a pressure sensor connected to the controller, the sensor sensing drive fluid after the drive fluid exits the metering flow valve 600, one alternative being disposition of the sensor in the drive fluid line between the exit of the metering flow valve and the entry port to the lower fluid chamber of the piston, another alternative being disposition of the sensor between the exit port of the upper drive fluid chamber of the piston and the directional valve.

As shown in FIGS. 2A-2AAA, 2B, a supply of pneumatic fluid 14 is fed first through a directional control valve 750 mechanism that switches the pneumatic fluid flow to the actuator cylinders in either of two directions: fluid out to withdraw the pin upstream, FIG. 2A, 2AA and fluid in to drive the pin downstream, FIG. 2AAA. At the beginning of an injection cycle the gate of a lateral valve 34, 36 is closed and the pneumatic system is in the directional configuration of FIG. 2AAA. When a cycle is started, the directional configuration of the directional valve 750 of the pneumatic system 700 is switched by controller 16 to the configuration of FIG. 2A or 2AA. The pneumatic system includes a flow restriction valve 600 that is controlled by controller 16 to vary the rate of flow of pneumatic fluid to the actuator 941, 951 to vary the rate of travel of the actuator 941/valve pin 1041 upstream according to a predetermined pressure profile (e.g. FIGS. 5AA, 5AAA, 5BB, 5BBB) or to drive the actuator 941/valve pin 1041 downstream. Although not shown in FIGS. 2A, 2B, the controller 16 and pneumatic system 700 can control the direction and rate of travel of the pistons of actuators 940 and 942 in a manner similar to the manner of control of actuator 941 via the connections shown in FIG. 1.

The user programs controller 16 via data inputs on a user interface to instruct the pneumatic system 700 via control of the degree of openness of the restriction valve 600 to drive pins 1041, 1042 at an upstream velocity of travel that is reduced relative to a maximum velocity that the pneumatic system 700 can drive the pins 1041, 1042 to travel. The reduced velocity at which the actuator 941 and associated valve pin 1041 are driven is determined by a predetermined profile of reduced drive fluid pressures that is followed by the controller 16 based on the metered pressure exiting valve 600 that is sensed by sensor 603 in line 703 and sent to the controller 16 during an injection cycle, the controller 16 controlling the degree of openness of valve 600 which in turn controls the degree of pressure exiting valve 600 in line 703.

As described below, the controller 16 drives the actuator 941/valve pin 1041 at the profile of reduced pin withdrawal rate or velocity either until a position sensor such as 951, 952 detects that an actuator 941, 952 or an associated valve pin (or another component), has reached a certain position (e.g. as in FIGS. 5AA, 5BB) as sensed by the position sensor 951, 952 such as at the end point COP, COP2, FIGS. 3B, 4B of a restricted flow path RP, RP2, In an alternative embodiment, the user can program controller 16 via to instruct the pneumatic system 700 to drive pins 1041, 1042 at the profile of reduced velocity of upstream travel for a predetermined amount of time. In such an embodiment, the reduced pin withdrawal rate or velocity is executed for a preselected amount of time that is less than the time of the entire injection cycle, the latter part of the injection cycle being executed with the pins 1041, 1042 being withdrawn at a higher velocity typically the highest velocity at which the pneumatic system is capable of driving the pins 1041, 1042. A typical amount of time over which the pins are instructed to withdraw at a reduced velocity is between about 0.25 and about 10 seconds, more typically between about 0.5 and about 5 seconds, the entire injection cycle time typically being between about 4 seconds and about 30 seconds, more typically between about 6 seconds and about 12 seconds. In such an embodiment, the periods of time over which the pins 1041, 1042 are withdrawn at reduced velocities are typically determined empirically by trial and error runs. One or more, typically multiple, trial injection cycle runs are carried out to make specimen parts from the mold. Each trial injection cycle run is carried out using a different period or periods of time at which the pins 1041, 1042 are withdrawn at one or more reduced velocities over the trial period(s) of time, and the quality of the parts produced from all such trial runs are compared to determine the optimum quality producing time(s) of reduced velocity pin withdrawals. When the optimum time(s) have been determined, the controller is programmed to carry out an injection cycle where the pin withdrawal velocities of pins 1041 are reduced for the predetermined amounts of time at the predetermined reduced withdrawal rates.

Figure 1D:
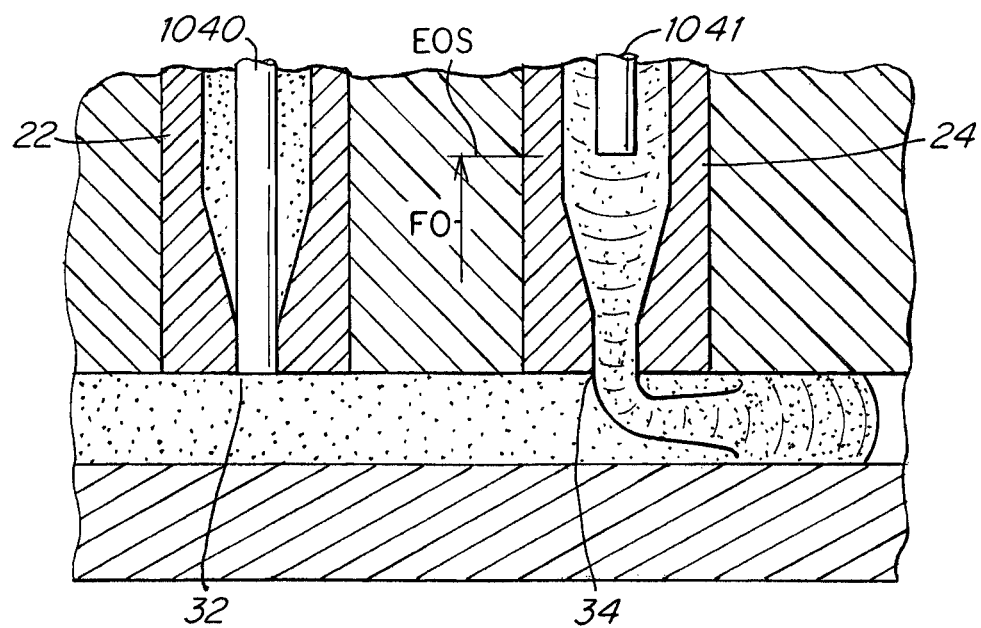
Figure 1E:
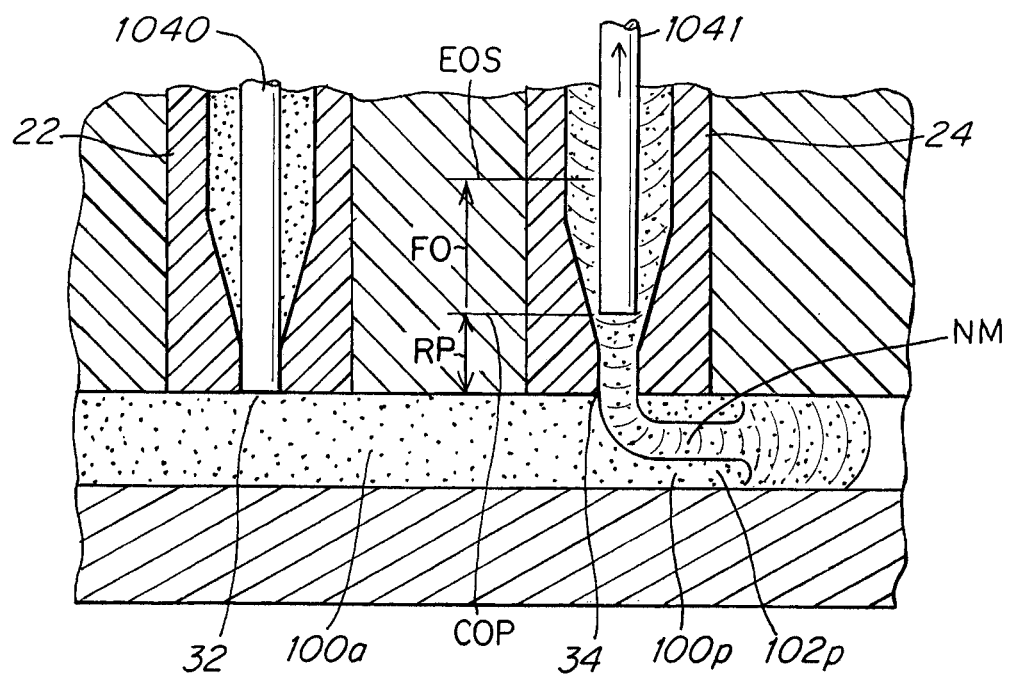

FIG. 1 shows position sensors 950, 951, 952 for sensing the position of the actuator cylinders 941, 942, 952 and their associated valve pins (such as 1041, 1042, 1052) and feed such position information to controller 16 for monitoring purposes. As shown, fluid material 18 is injected from an injection machine into a manifold runner 19 and further downstream into the bores 44, 46 of the lateral nozzles 24, 22 and ultimately downstream through the gates 32, 34, 36. When the pins 1041, 1042 are withdrawn upstream to a position where the tip end of the pins 1041 are in a fully upstream open position such as shown in FIG. 1D, the rate of flow of fluid material through the gates 34, 36 is at a maximum. However when the pins 1041, 1042 are initially withdrawn beginning from the closed gate position, FIG. 1A, to intermediate upstream positions, FIGS. 1B, 1C, a gap 1154, 1156 that restricts the velocity of fluid material flow is formed between the outer surfaces 1155 of the tip end of the pins 44, 46 and the inner surfaces 1254, 1256 of the gate areas of the nozzles 24, 20. The restricted flow gap 1154, 1156 remains small enough to restrict and reduce the rate of flow of fluid material 1153 through gates 34, 36 to a rate that is less than maximum flow velocity over a travel distance RP of the tip end of the pins 1041, 1042 going from closed to upstream as shown in FIGS. 1, 1B, 1C, 1E and 3B, 4B.

The pins 1041 can be controllably withdrawn at one or more reduced velocities (less than maximum) for one or more periods of time over the entirety of the length of the path RP over which flow of mold material 1153 is restricted. Preferably the pins are withdrawn at a reduced velocity over more than about 50% of RP and most preferably over more than about 75% of the length RP. As described below with reference to FIGS. 3B, 4B, the pins 1041 can be withdrawn at a higher or maximum velocity at the end COP2 of a less than complete restricted mold material flow path RP2.

The trace or visible lines that appear in the body of a part that is ultimately formed within the cavity of the mold on cooling above can be reduced or eliminated by reducing or controlling the velocity of the pin 1041, 1042 opening or upstream withdrawal from the gate closed position to a selected intermediate upstream gate open position that is preferably 75% or more of the length of RP.

RP can be about 1-8 mm in length and more typically about 2-6 mm and even more typically 2-4 mm in length. As shown in FIG. 2 in such an embodiment, a control system or controller 16 is preprogrammed to control the sequence and the rates of valve pin 1040, 1041, 1042 opening and closing. The controller 16 controls the rate of travel, namely velocity of upstream travel, of a valve pin 1041, 1042 from its gate closed position for at least the predetermined amount of time that is selected to withdraw the pin at the selected reduced velocity rate.

The velocity of withdrawal of the valve pins 1041, 1042 is determined by regulation of the flow of pneumatic drive fluid that is pumped from a supply 14 to the actuators 941, 942 through flow restrictor valve 600, FIGS. 1, 2, 2A, 2B. When the flow restrictor valve 600 is completely open, namely 100% open, allowing maximum flow of the pressurized pneumatic fluid to the actuator cylinders, the valve pins 1041, 1042 are driven at a maximum upstream travel velocity.

According to the invention, the degree of openness of the flow restrictor valve 600 is adjusted in response to sensing with sensor 603 of the drive fluid pressure that exits restrictor valve 600. The controller automatically adjusts the degree of openness of flow restrictor valve 600 to less than 100% open to cause the reduced pressure in line 703 to match and follow the predetermined profile of pressure shown for example in FIGS. 5AA, 5AAA, 5BB, 5BBB which in turn adjusts rate and volume flow of pressurized pneumatic fluid to the actuator cylinders which in turn adjusts the velocity of upstream travel of the pins 1041, 1042 according to the predetermined exit pressure in line 703 for either a selected period of time as in FIG. 5AAA or 5BBB or until the actuator/valve pin has travelled upstream to a predetermined position as in FIGS. 5AA, 5BB, the predetermined upstream position being sensed by a position sensor 951, 952, 950 and signalling controller 16. Upon expiration of the predetermined amount of time (FIGS. 5AAA, 5BBB) or upon reaching the predetermined upstream position (FIGS. 5AA, 5BB), the controller 16 instructs the metering valve to open to a greater degree of openness to drive the actuator 941/pin 1041 at a higher velocity typically to the highest degree of openness of the valve 600 and thus the highest possible velocity.

In the FIGS. 5AA, 5BB embodiment, the actuator/valve pin travels the predetermined length of the reduced velocity path RP, RP2, at the end of which the position sensor signals the controller 16 whereby the controller 16 determines that the end COP, COP2 has been reached and the valve 600 is opened to a higher velocity, typically to its 100% open position to allow the actuator pistons and the valve pins

1041, 1042 to be driven at maximum upstream velocity FOV in order to reduce the cycle time of the injection cycle.

The valve 600 typically comprises a restrictor valve that is controllably positionable anywhere between completely closed (0% open) and completely open (100% open). Adjustment of the position of the restrictor valve 600 is typically accomplished via a source of electrical power that controllably drives an electromechanical mechanism that causes the valve to rotate such as a rotating spool that reacts to a magnetic or electromagnetic field created by the electrical signal output of the controller 16, namely an output of electrical energy, electrical power, voltage, current or amperage the degree or amount of which can be readily and controllably varied by conventional electrical output devices. The electro-mechanism is controllably drivable to cause the valve 600 to open or close to a degree of openness that is proportional to the amount or degree of electrical energy that is input to drive the electro-mechanism. The velocity of upstream withdrawal travel of the pins 1041, 1042 are in turn proportional to the degree of openness of the valve 600. Thus the rate of upstream travel of the pins 1041, 1042 is proportional to the amount or degree of electrical energy that is input to the electro-mechanism drives valves 600. The electro-mechanism that is selected for driving the valve 600 establishes in the first instance the maximum amount of electrical energy or power (such as voltage or current) that is required to open the valve to its 100% open position.

The user implements a reduced upstream velocity of the pins 1041, 1042 over a given upstream length of travel or over a given amount of time by inputting to the controller 16 a profile of reduced exit fluid pressures that are implemented by adjusting the electrical drive mechanism that operates metering valve 600 to less than 100% of the maximum amount of electrical energy or power input (voltage or current) needed to open the valve 600 to 100% open at which setting maximum drive fluid pressure and, a fortiori, maximum actuator/pin velocity occurs.

In one embodiment, the user can implement reduced actuator/pin withdrawal velocity profiles by inputting reduced exit pressure profiles (or other data corresponding thereto) versus actuator/pin position into the controller 16. Exit pressure is the pressure of the valve drive fluid that exits the metering valve 600 during the upstream withdrawal portion of the injection cycle. In the examples provided, the exit pressure would be the pressure in one of lines 703, 705 or 707 as sensed by a respective one of sensors 603, 605, 607. In another embodiment, the user can implement reduced actuator/pin withdrawal velocity profiles by inputting to the controller 16 reduced exit pressure profiles or other data corresponding.thereto) versus time of withdrawal beginning from the time at which the gate is closed.

The user can also preselect the length of the path of travel RP, RP2 of the valve pin or other end of reduced velocity position of the valve pin or other component over the course of travel of which the material flow through the gate is restricted and input such selections into the controller 16. In an alternative embodiment the user can preselect the length of time during which the gate is restricted by a valve pin travelling over a restricted path length RP, RP2 and input such a selection into the controller 16.

The controller 16 includes conventional programming or circuitry that receives and executes the user inputs. The controller may include programming or circuitry that enables the user to input as a variable a selected pin velocity rather than a percentage of electrical output, the programming of the controller 16 automatically converting the inputs by the user to appropriate instructions for reduced energy input to the electro-mechanism that drives the valve 600.

Typically the user selects a profile of metered exit drive fluid pressures that corresponds to reduced pin withdrawal velocities that are less than about 90% of the maximum velocity (namely the velocity when the valve 600 is fully open), more typically less than about 75% of the maximum velocity and even more typically less than about 50% of the maximum velocity at which the pins 1041, 1042 are drivable by the pneumatic system. The actual maximum velocity at which the actuators 941, 942 and their associated pins 1041, 1042 are driven is predetermined by selection of the size and configuration of the actuators 941, 942, the size and configuration of the restriction valve 600 and the degree of pressurization and type of pneumatic drive fluid selected for use by the user. The maximum drive rate of the pneumatic system is predetermined by the manufacturer and the user of the system and is typically selected according to the application, size and nature of the mold and the injection molded part to be fabricated.

As shown by the series of examples of programs illustrated in FIGS. 5A, 5B, 5c, 5D one or more profiles of reduced pin withdrawal velocity can be selected and the pin driven by restricted pneumatic fluid flow between the gate closed (X and Y axis zero position) and the final intermediate upstream open gate position (4 mm for example in the FIG. 5A example, 5 mm in the FIG. 5B example) at which point the controller 16 in response to position sensing instructs the drive system to drive pin 1041, 1042 to travel upstream at a higher, typically maximum, upstream travel velocity (as shown, 100 mm/sec in the FIGS. 5A-5D examples). In the FIGS. 5A, 5B examples, the profile of reduced pin velocity is selected as being about 50, 25 and 75 mm/sec over the initial reduced velocity path length. In practice the velocity of the pin may or may not be precisely known, the Y velocity axis of FIGS. 5A, 5B corresponding to the drive fluid pressure profile of FIGS. 5AA, 5AAA, 5BB, 5BBB, the degree of precision in control over which depends and may vary slightly with the degree of precision in control over the opening of the flow restriction valve 600, 100 mm/sec corresponding to the valve 600 being completely 100% open (and pin being driven at maximum velocity); and 50 mm/sec corresponding to 50% electrical energy input to the electromechanism that drives the restriction valve 600 to one-half of its maximum 100% degree of openness. In the FIG. 5A example, the path length RP over which the valve pin 1041, 1042 travels at the reduced 50 mm/sec velocity is 4 mm. After the pin 1041, 1042 has been driven to the upstream position COP position of about 4 mm from the gate closed GC position, the controller 16 instructs the electro-mechanism that drives the valve 600 (typically a magnetic or electromagnetic field driven device such as a spool) to open the restrictor valve 600 to full 100% open at which time the pin (and its associated actuator piston) are driven by the pneumatic system at the maximum travel rate 100 mm/sec for the predetermined, given pressurized pneumatic system.

Figure 5B:
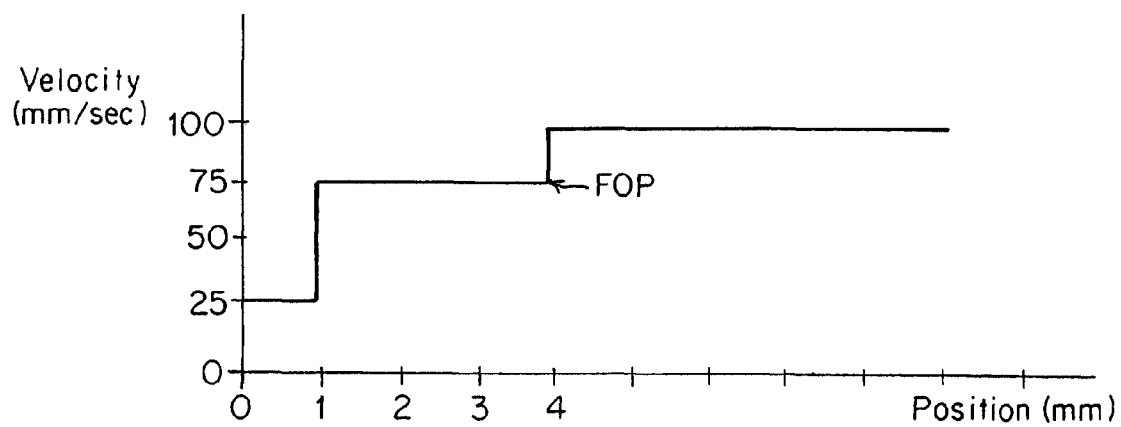
Figure 5C:
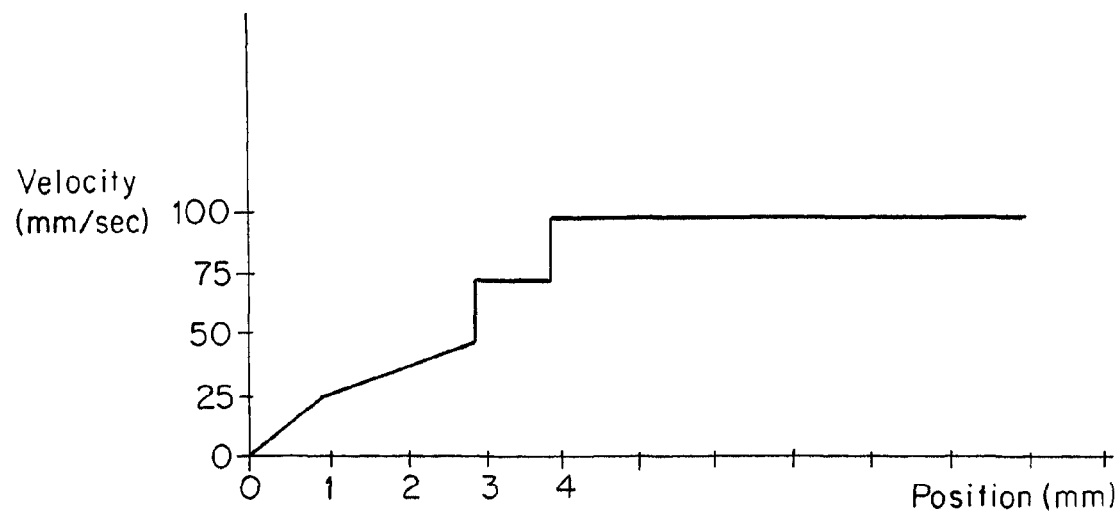
Figure 5D:

FIGS. 5B-5D illustrate a variety of alternative profiles for driving the pin 1041, 1042 at reduced velocities for various durations of time. For example as shown in FIG. 5B, the pin is driven for 0.02 seconds at 25 mm/sec, then for 0.06 seconds at 75 mm/sec and then allowed to go to full valve open velocity shown as 100 mm/sec. Full valve open or maximum velocity is typically determined by the nature of pneumatic (or pneumatic) valve or motor drive system that drives the valve pin. In the case of a pneumatic (or pneumatic) system the maximum velocity that the system is capable of implementing is determined by the nature, design and size of the pumps, the fluid delivery channels, the actuator, the drive fluid (liquid or gas), the restrictor valves and the like.

As shown in FIGS. 5A-5D, the velocity of the valve pin when the pin reaches the end of the reduced velocity period, the valve 600 can be instructed to assume the full open position essentially instantaneously or alternatively can be instructed to take a more gradual approach up, between 0.08 and 0.12 seconds, to the maximum valve openness as shown in FIG. 5D. In all cases the controller 16 instructs the valve pin 1041, 1042 to travel continuously upstream rather than follow a drive fluid pressure profile where the pin might travel in a downstream direction during the course of the injection cycle. Most preferably, the actuator, valve pin, valves and fluid drive system are adapted to move the valve pin between a gate closed position and a maximum upstream travel position that defines an end of stroke position for the actuator and the valve pin. Most preferably the valve pin is moved at the maximum velocity at one or more times or positions over the course of upstream travel of the valve pin past the upstream gate open position.

Alternatively to the pneumatic system depicted and described, a pneumatic or gas driven system can be used and implemented in the same manner as described above for a pneumatic system.

Preferably, the valve pin and the gate are configured or adapted to cooperate with each other to restrict and vary the rate of flow of fluid material 1153, FIGS. 3A-3B, 4A-4B over the course of travel of the tip end of the valve pin through the restricted velocity path RP. Most typically as shown in FIGS. 3A, 3B the radial tip end surface 1155 of the end 1142 of pin 1041, 1042 is conical or tapered and the surface of the gate 1254 with which pin surface 1155 is intended to mate to close the gate 34 is complementary in conical or taper configuration. Alternatively as shown in FIGS. 4A, 4B, the radial surface 1155 of the tip end 1142 of the pin 1041, 1042 can be cylindrical in configuration and the gate can have a complementary cylindrical surface 1254 with which the tip end surface 1155 mates to close the gate 34 when the pin 1041 is in the downstream gate closed position. In any embodiment, the outside radial surface 1155 of the tip end 1142 of the pin 1041 creates restricted a restricted flow channel 1154 over the length of travel of the tip end 1142 through and along restricted flow path RP that restricts or reduces the volume or rate of flow of fluid material 1153 relative to the rate of flow when the pin 1041, 1042 is at a full gate open position, namely when the tip end 1142 of the pin 1041 has travelled to or beyond the length of the restricted flow path RP (which is, for example the 4 mm upstream travel position of FIGS. 5A-5C).

In one embodiment, as the tip end 1142 of the pin 1041 continues to travel upstream from the gate closed GC position (as shown for example in FIGS. 3A, 4A) through the length of the RP path (namely the path travelled for the predetermined amount of time), the rate of material fluid flow 1153 through restriction gap 1154 through the gate 34 into the cavity 30 continues to increase from 0 at gate closed GC position to a maximum flow rate when the tip end 1142 of the pin reaches a position FOP (full open position), FIGS. 5A-5D, where the pin is no longer restricting flow of injection mold material through the gate. In such an embodiment, at the expiration of the predetermined amount of time when the pin tip 1142 reaches the FOP (full open) position FIGS. 5A, 5B, the pin 1041 is immediately driven by the pneumatic system at maximum velocity FOV (full open velocity) typically such that the restriction valve 600 is opened to full 100% open.

In embodiments, where the tip 1142 has reached the end of restricted flow path RP2 and the tip 1142 is not necessarily in a position where the fluid flow 1153 is not still being restricted, the fluid flow 1153 can still be restricted to less than maximum flow when the pin has reached the changeover position COP2 where the pin 1041 is driven at a higher, typically maximum, upstream velocity FOV. In the examples shown in the FIGS. 3B, 4B examples, when the pin has travelled the predetermined path length at reduced velocity and the tip end 1142 has reached the changeover point COP, the tip end 1142 of the pin 1041 (and its radial surface 1155) no longer restricts the rate of flow of fluid material 1153 through the gap 1154 because the gap 1154 has increased to a size that no longer restricts fluid flow 1153 below the maximum flow rate of material 1153. Thus in one of the examples shown in FIG. 3B the maximum fluid flow rate for injection material 1153 is reached at the upstream position COP of the tip end 1142. In another example shown in FIG. 3B 4B, the pin 1041 can be driven at a reduced velocity over a shorter path RP2 that is less than the entire length of the restricted mold material flow path RP and switched over at the end COP2 of the shorter restricted path RP2 to a higher or maximum velocity FOV. In the FIGS. 5A, 5B examples, the upstream FOP position is about 4 mm and 5 mm respectively upstream from the gate closed position. Other alternative upstream FOP positions are shown in FIGS. 5C, 5D.

In another alternative embodiment, shown in FIG. 4B, the pin 1041 can be driven and instructed to be driven at reduced or less than maximum velocity over a longer path length RP3 having an upstream portion UR where the flow of injection fluid mold material is not restricted but flows at a maximum rate through the gate 34 for the given injection mold system. In this FIG. 4B example the velocity or drive rate of the pin 1041 is not changed over until the tip end of the pin 1041 or actuator 941 has reached the changeover position COP3. In this embodiment, a position sensor senses either that the valve pin 1041 or an associated component has travelled the path length RP3 or reached the end COP3 of the selected path length and the controller receives and processes such information and instructs the drive system to drive the pin 1041 at a higher, typically maximum velocity upstream. In another alternative embodiment, the pin 1041 can be driven at a less than maximum velocity throughout the entirety of the travel path of the pin during an injection cycle from the gate closed position GC up to the end-of-stroke EOS position, the controller 16 being programmed to instruct the drive system for the actuator to be driven at one reduced velocity for an initial path length or period of time and at another less than maximum velocity subsequent to the intial reduced velocity path or period of time for the remainder of the injection cycle whereby the actuator/valve pin travels at a less than maximum velocity for an entire closed GC to fully open EOS cycle.

In the FIGS. 5A-5D examples, FOV is 100 mm/sec. Typically, when the time period or path length for driving the pin 1041 at reduced velocity has expired or been reach and the pin tip 1142 has reached the position COP, COP2, the restriction valve 600 is opened to full 100% open velocity FOV position such that the pins 1041, 1042 are driven at the maximum velocity or rate of travel that the pneumatic system is capable of driving the actuators 941, 942. Alternatively, the pins 1041, 1042 can be driven at a preselected FOV velocity that is less than the maximum velocity at which the pin is capable of being driven when the restriction valve 600 is fully open but is still greater than the selected reduced velocities that the pin is driven over the course of the RP, RP2 path to the COP, COP2 position.

At the expiration of the predetermined reduced velocity drive time, the pins 1041, 1042 are typically driven further upstream past the COP, COP2 position to a maximum end-of-stroke EOS position. The upstream COP, COP2 position is downstream of the maximum upstream end-of-stroke EOS open position of the tip end 1142 of the pin. The length of the path RP or RP2 is typically between about 2 and about 8 mm, more typically between about 2 and about 6 mm and most typically between about 2 and about 4 mm. In practice the maximum upstream (end of stroke) open position EOS of the pin 1041, 1042 ranges from about 8 mm to about 18 inches upstream from the closed gate position GC.

The controller 16 includes a processor, memory, user interface and circuitry and/or instructions that receive and execute the user inputs of percentage of maximum valve open or percentage of maximum voltage or current input to the motor drive for opening and closing the restriction valve, time duration for driving the valve pin at the selected valve openings and reduced velocities.

Figure 6A:
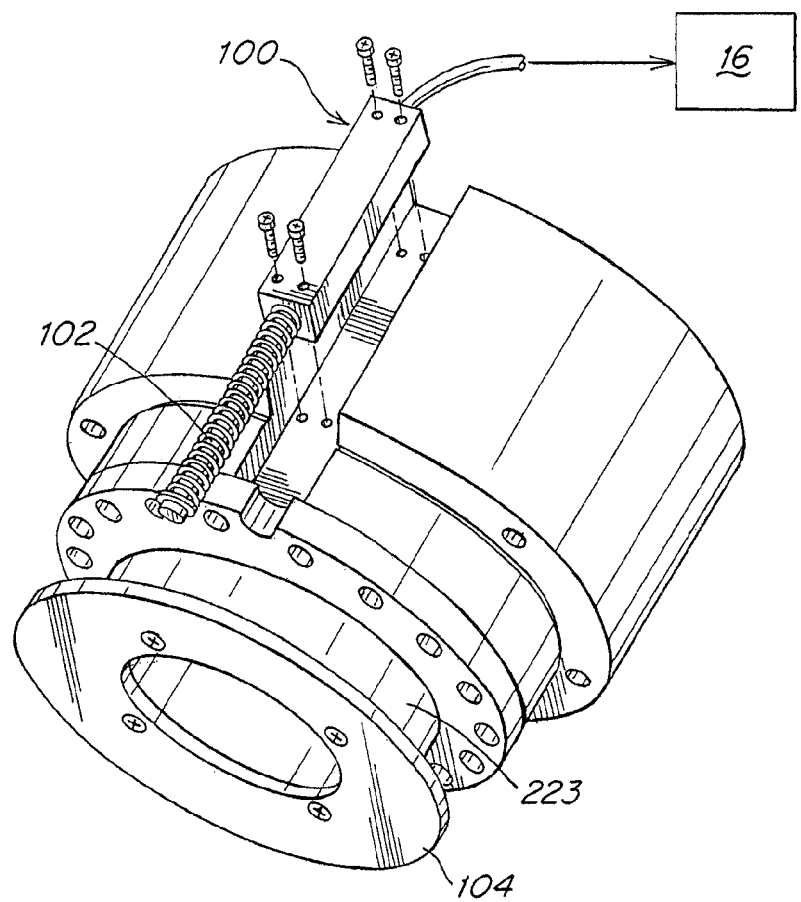
FIGS. 6A-6B show various embodiments of position sensors that can be used in a variety of FIG. 2A embodiments of the invention, the sensors shown in these figures being mounted so as to measure the position of the piston component of the actuator which is indicative of the position of the valve pin relative to the gate.
Figure 6B:
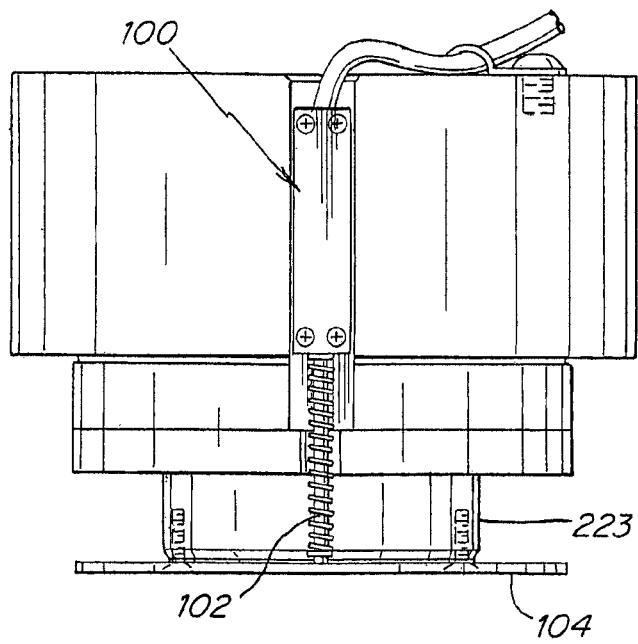
Figure 6C:
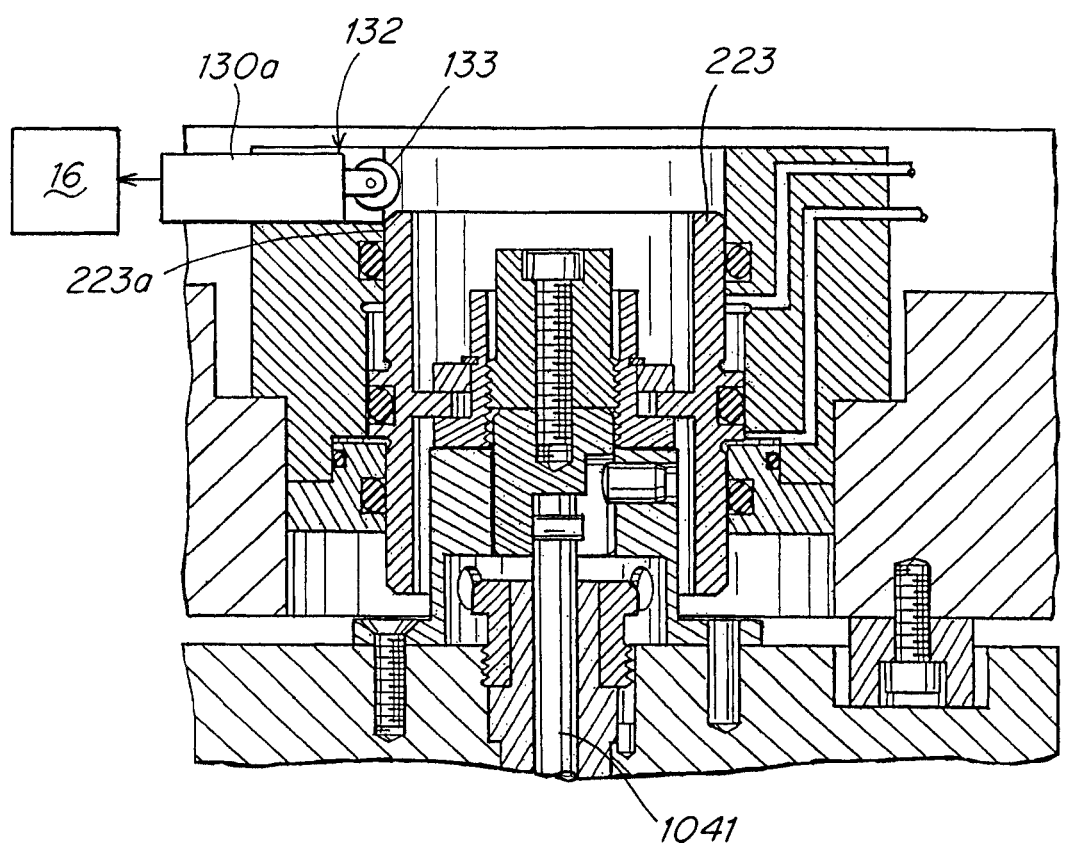
FIGS. 6C-6D show embodiments using limit switches that detect and signal specific positions of the actuator that can be used in a variety of FIG. 2A embodiments of the invention to determine velocity, position and switchover to higher openness of valve restrictor and/or upstream velocity of travel of the actuator and valve pin.
Figure 6D:
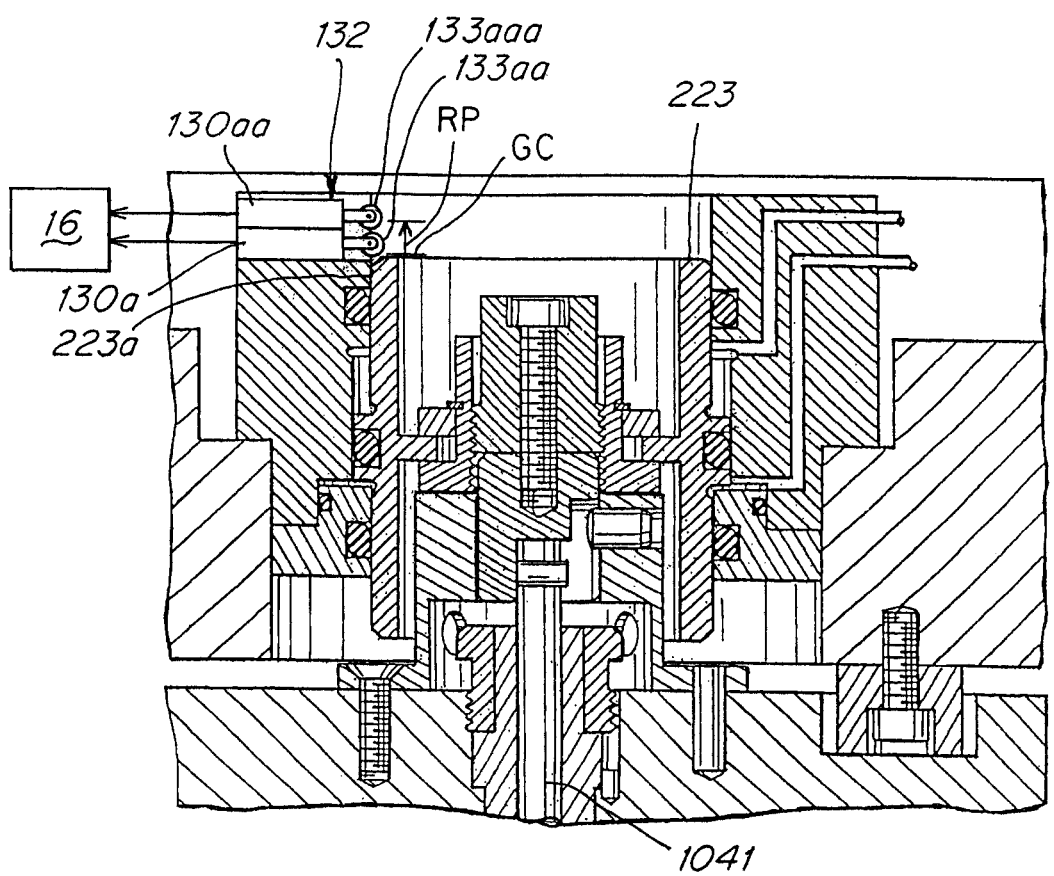

With regard to embodiments where the use of a position sensor is employed, FIGS. 6A-6D show various examples of position sensors 100, 114, 227, 132 the mounting and operation of which are described in U.S. Patent Publication no. 20090061034 the disclosure of which is incorporated herein by reference. As shown the position sensor of FIGS. 6A and 6B for example can track and signal the position of the piston of the actuator piston 223 continuously along its entire path of travel from which data pin velocity can be continuously calculated over the length of RP, RP2, RP3 via spring loaded follower 102 that is in constant engagement with flange 104 during the course of travel of piston 223. Mechanism 100 constantly sends signals to controller 16 in real time to report the position of pin 1041 and its associated actuator. FIGS. 6C, 6D show alternative embodiments using position switches that detect position at specific individual positions of the actuator and its associated valve pin 1041. The FIG. 6C embodiment uses a single trip position switch 130*a* with trip mechanism 133 that physically engages with the piston surface 223*a* when the piston 223 reaches the position of the trip mechanism 133. The FIG. 6D embodiment shows the use of two separate position switches 130*a*, 130*aa* having sequentially spaced trips 133*aa* and 133*aaa* that report the difference in time or distance between each trip engaging surface 223*a* of the piston, the data from which can be used by controller 16 to calculate velocity of the actuator based on the time of travel of the actuator from tripping one switch 130*a* and then tripping the next 130*aa*. In each embodiment the position switch can signal the controller 16 when the valve pin 1041, 1042 has travelled to one or more selected intermediate upstream gate open positions between GC and RP, RP2 or RP3 so that the velocity of the pin can be adjusted to the selected or predetermined velocities determined by the user. As can be readily imagined other position sensor mechanisms can be used such as optical sensors, sensors that mechanically or electronically detect the movement of the valve pin or actuator or the movement of another component of the apparatus that corresponds to movement of the actuator or valve pin.

As discussed above, control over the withdrawal (upstream) velocity of actuator or pin movement is accomplished by controlling the degree of fluid pressure that exits the metering valve which in turn is controlled by controlling the degree of openness of the fluid restriction valve 600. A profile of exit fluid pressures versus time or pin position is determined in advance and input to the controller which includes a program and instructions that automatically adjust the position of valve 600 based on the real time pressure signal received from sensor 603 (or 605 or 607) to adjust the exit pressure of the drive fluid in line 703 (or 705 or 707) which in turn adjusts the rate or velocity of upstream movement of the actuator 941/valve pin 1041 (and/or actuators 1040, 1042 and valve pins 940, 942).

A. Low Static Friction Pneumatic Piston

Static friction between the surface contacts of two solid objects is the threshold of force required to overcome static cohesion. Static Friction at the interface between typical PTFE or FKM elastomer pneumatic seals and cylinder housings or piston rods hinders smooth motion of pneumatic cylinders. A force large enough to begin the motion of the cylinder also corresponds to rapid motion of the cylinder once it has broken free of static friction. Thus static friction prevents the possibility of a smoothly actuating the pneumatic actuator at low speeds.

The use of a pneumatic cylinder having sealing materials that have lower static cohesion between moving parts is preferred over actuators or cylinder that have seals comprised of elastomeric polymers such as PTFE or FKM or the like. Such low static friction devices provide more accurate, precise and smooth control of movement of the actuator piston and valve pin particularly in systems using lower air pressures to drive the cylinder or actuator.

Use of Mechanical Pneumatic Flow Restrictor

Restrictor valves can be used to control the working speed or velocity of a pneumatic piston and associated pin of a pneumatic actuator by reducing the rate of air entry into or exiting from the piston chambers of a pneumatically powered actuator. Valve gate actuation velocities can be reduced by constricting the volumetric flow rate into or out of the cylinder by the use of a flow restrictor that is mechanically and manually set to a single velocity control setting. By using a valve which is independent of pressure the force of the cylinder can be maintained even as the velocities are reduced.

An Example of off-the-shelf mechanical flow restrictor: http://www.automationdirect.comistatic/specs/nitraflowinline.pdf Further most preferably, the volume of air disposed between the mechanical flow restrictor and the actuator is minimized to improve the responsiveness of the actuator. Volumes less than about 100 cubic centimeters are preferred.

Dynamic Pressure Control Valve

A dynamic pressure control valve 2030, 2032, FIGS. 7A-8C, in conjunction with a controller that controls the degree of restriction and flow of pneumatic gas that drives the pneumatic actuator piston, can be used to controllably vary the drive pressure in a pneumatic cylinder and in turn controllably drive and vary the velocity of travel of the pneumatic actuator piston and associated valve pin. Use of such a flow restrictor controlled by a controller, allows for two step actuator and pin velocities as implemented in pneumatic systems and disclosed in Applicants' prior international applications published as WO2012074879 and WO2012087491 the disclosures of which are incorporated in their entirety herein by reference—where the valve pin stroke is initially slow on withdrawal and then rapidly moved back at high speed to allow full flow unrestricted flow of injection material.

Such an electronic flow restrictor can also be used to direct the travel of the piston and valve pin according to a predetermined profile of multiple varying velocities during the course of an injection cycle such as disclosed in U.S. application Ser. No. 61/730,296 filed Nov. 27, 2012 the disclosure of which is incorporated by reference in its entirety as if fully set forth herein. An Example off-the-shelf dynamic pressure control valve: http:resources.norgren-.com/document resources/en/N en 6 6 030 VP50.pdf Integrated Electronic Actuator Having Controllable Restriction Fine pneumatics flow control is hindered by the compressibility of air or other gas disposed between the source of compressed air or gas and the entry or exit ports 2000, 2002 to or from the drive piston chambers of the pneumatic actuator or cylinder 2020. The present invention can Integrate the pneumatics control mechanism 16 into the body of the actuator or cylinder 2020 thus reducing the volume of air or gas being controllably injected into the piston drive chambers of the actuator 2020 and thus limiting losses of pressure and reducing the aggregate delayed response impact arising out of air or gas compression. Electric motors 2010, 2012 mounted onto the actuator 2020 can be employed as an interconnected component of the actuator 2020 to achieve integrated flow control. Control over the precise position of the motor rotor or shaft can be precisely controlled and altered to precisely vary and change the size of the inlet or outlet ports such as port 2042 to the piston drive chambers. In particular a pneumatic actuator can be provided with inlet and outlet ports 2040 that are controllably variable in their radial cross-sectional area which act to in turn controllably vary the degree or rate of air or gas flow into or out of the actuator drive chambers which in turn acts to controllably vary the velocity of travel of the actuator piston and associated valve pin 1040, 1041. A stepping motor 2010, 2012 interconnected to a controller 16 having an algorithm that instructs the motors to rotate R1, R2 the tubes such as 2032 to open or close the ports 2040 to any desired varying degree such as full unrestricted 2032fu, FIG. 8A, partially restricted 2032pr, FIG. 8B and fully restricted 2032fr, FIG. 8C enables implementation of complex profiles of flow restriction and in turn simple or complex predetermined profiles of piston or valve pin velocity and travel over the course of an injection cycle.

Figure 7A:
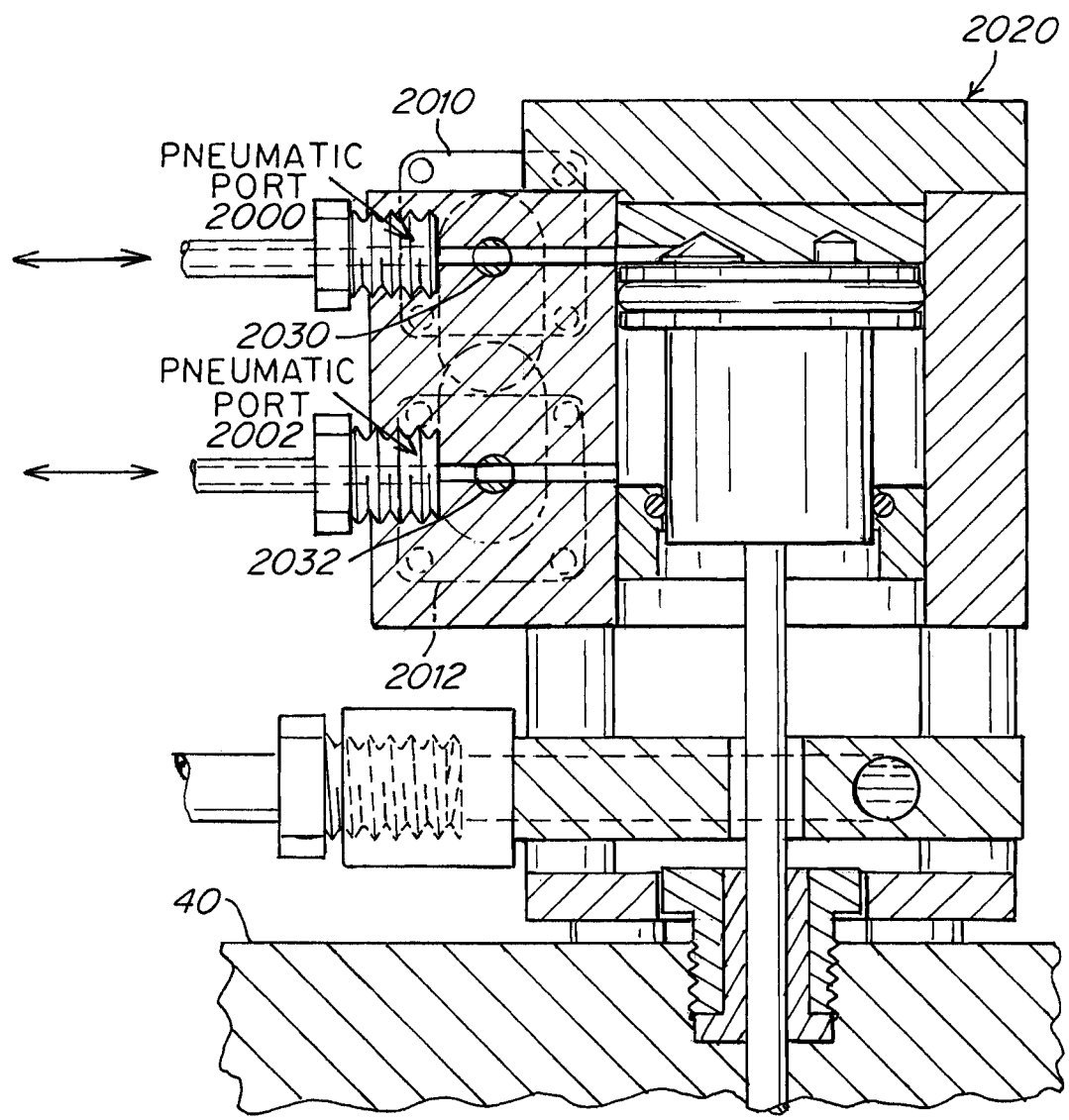
FIG. 7A is a side view of a pneumatic actuator for use in the invention, the actuator having a pair of electric motors integrally mounted to the housing of the piston of the actuator, the electric motors controlling axial rotation of gas delivery tubes that route pressurized gas that drives the actuator piston to upper and lower gas drive chambers, the degree of rotation of the delivery tubes varying the rate of drive gas flow and thus velocity of the actuator piston.
Figure 7B:
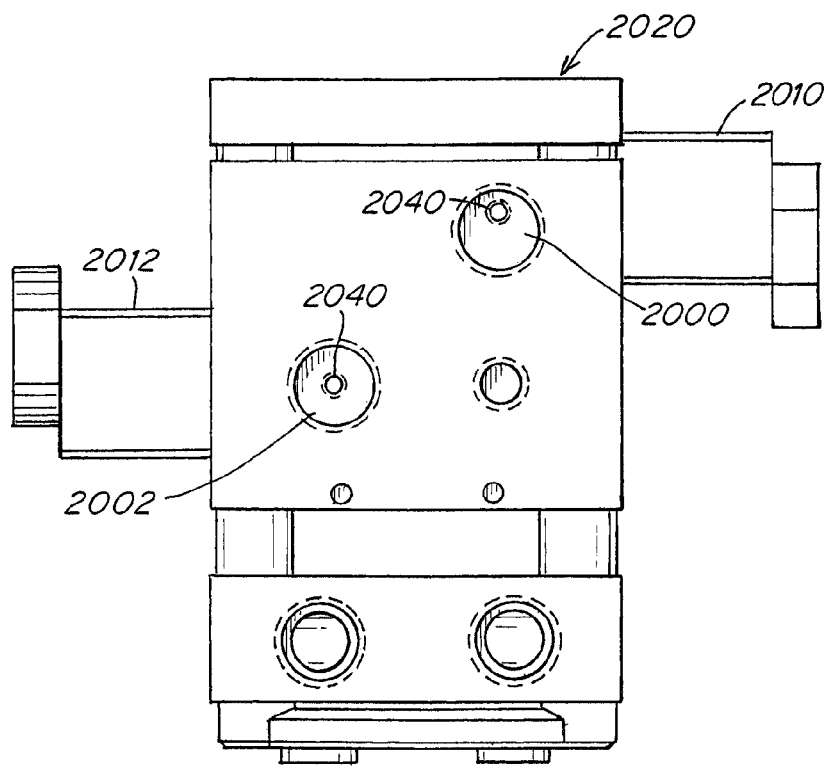
FIGS. 7B and 7C are front views of the actuator of FIG. 7A, FIG. 7B showing the actuator with external housing and FIG. 7C showing the arrangement of gas delivery tubes where the housing is transparent.
Figure 7C:
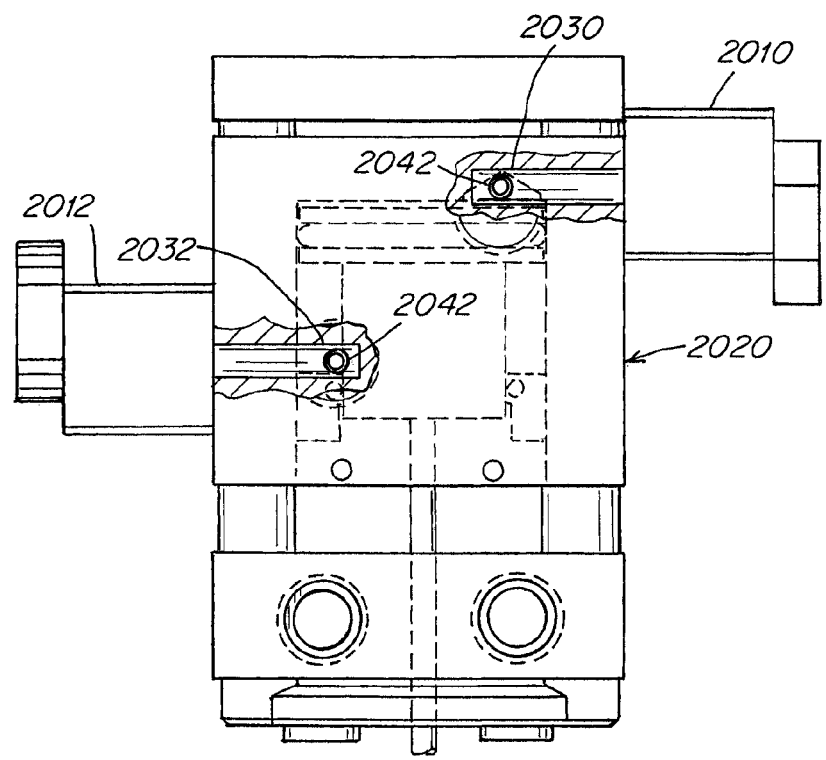
Figure 8A:
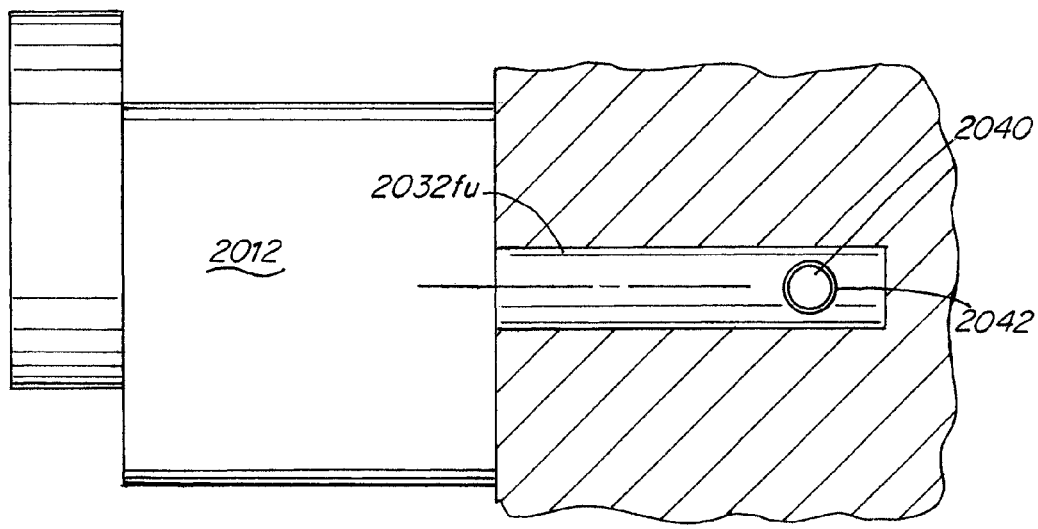
FIGS. 8A-8C are a close-up view of a portion of the FIG. 7C view showing one of the gas delivery tubes interconnected to one of the motors in sequential axially rotated positions where the entry aperture port to one of the gas drive chambers of the actuator is fully open, FIG. 8A, partially restricted, FIG. 8B and fully restricted, FIG. 8C.
Figure 8B:
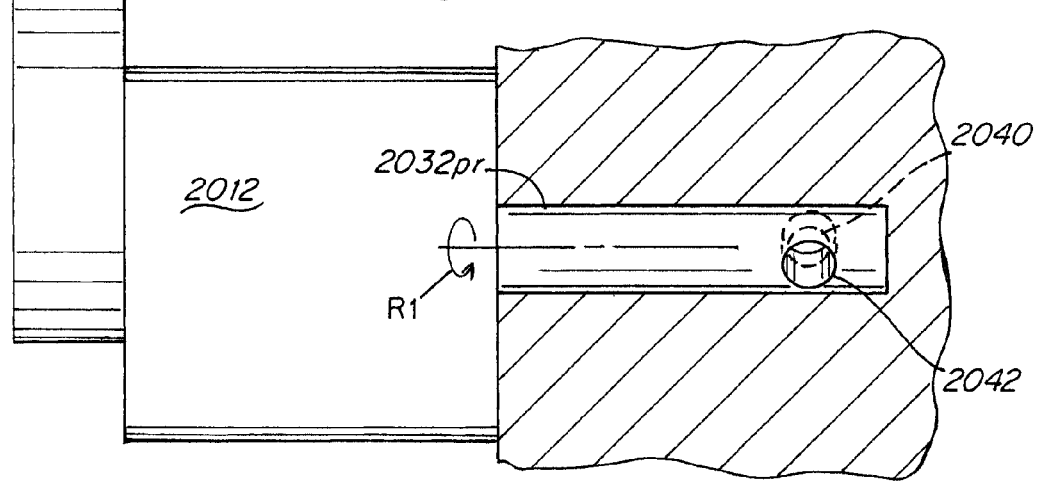
Figure 8C:
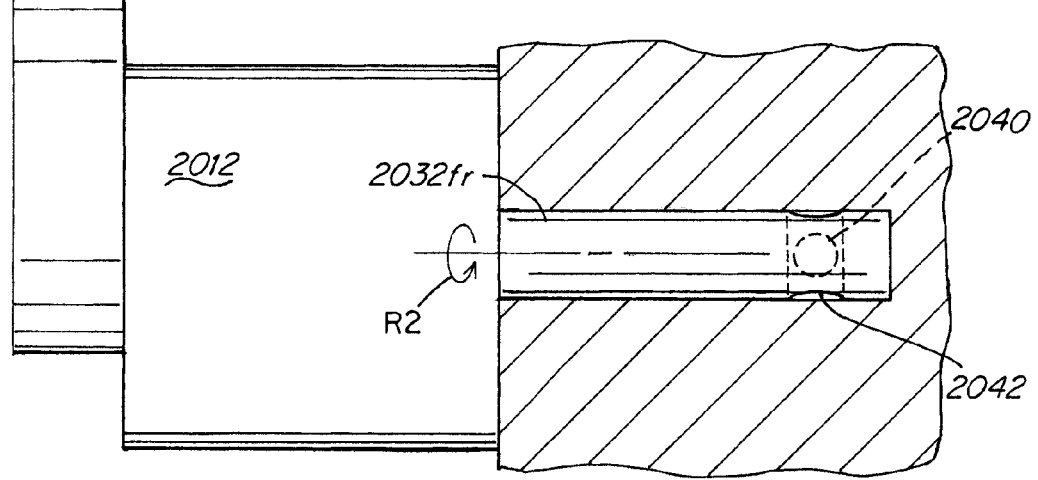

Generic examples of pneumatic actuators 2020 having entry and exit gas ports 2000, 2002, FIGS. 7A-7C, that are controllably in variable size and having one or more electric motors 2010, 2012 integrated onto or into the body of the actuator 2020 by mounting thereon is shown in FIGS. 7A, 7B, 7C, 8A, 8B, 8C, the one or more integrated motors 2010, 2012 being interconnected to the port size variation mechanisms 2030, 2032 that are adapted to controllably vary the size of the inlet apertures 2040 to the ports 2000, 2002 according to a predetermined algorithm that controllably drives the motors to controllably rotate R1, R2 the tubes 2030, 2032 to cause pneumatic drive fluid (such as air) to be delivered to and from the drive chambers of the actuator at controlled rates and volumes of flow.

Figure 9:
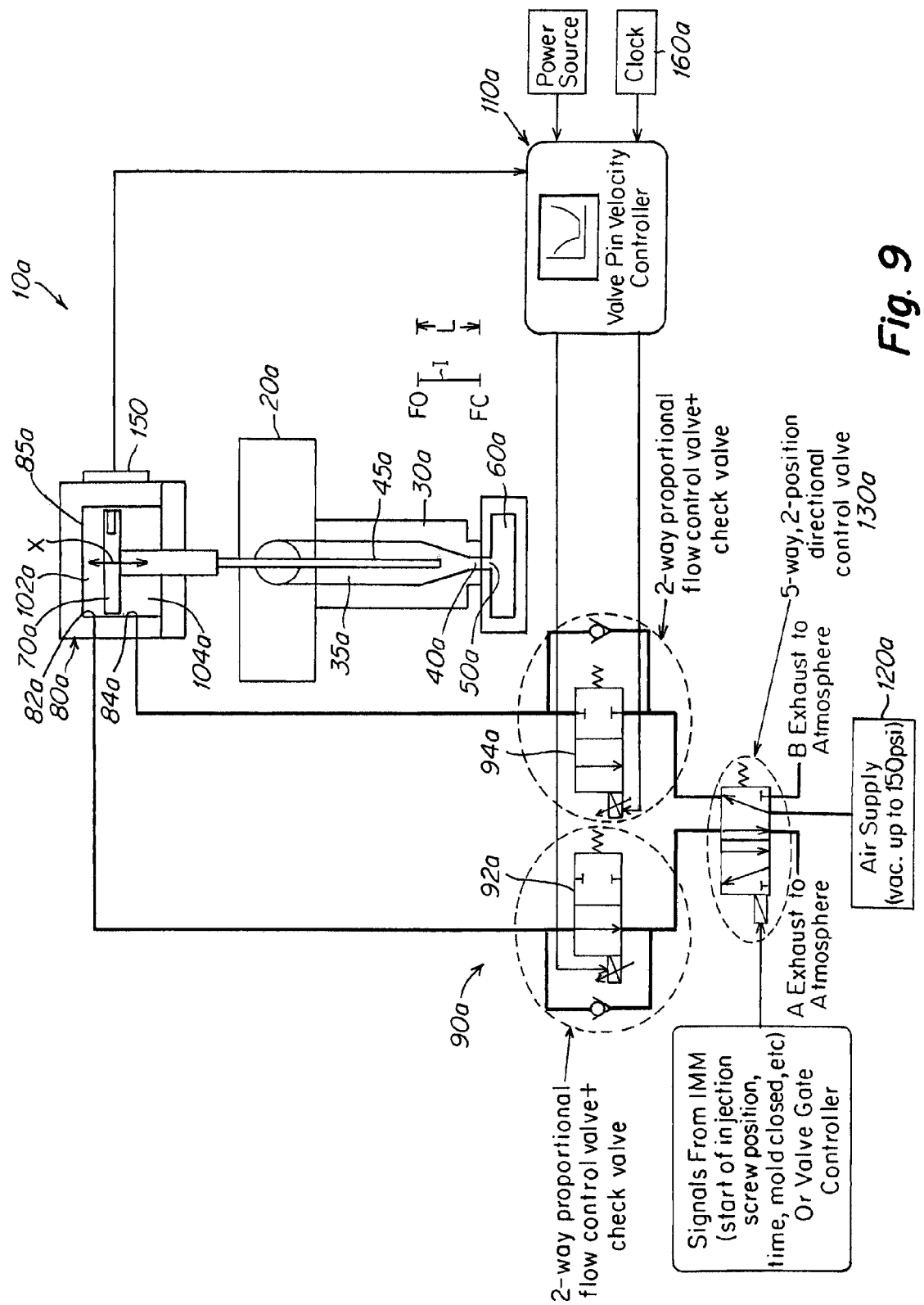
FIG. 9 is a schematic of an embodiment of the invention showing a pneumatically powered system injection molding system comprising a pair of remotely controllable flow control valves interconnected respectively between the flow ports of the upper and lower gas drive chambers of a pneumatic actuator and a master source of pressurized gas, typically air, that drives the system.

In another embodiment, there is shown in FIG. 9 an injection molding system 10a comprising an injection fluid distribution manifold 20a that routes injection fluid to the bore of a nozzle 30a having an exit port 40a that mates and communicates with a gate 50a to a mold cavity 60a. A valve comprising a valve pin 45a and a pneumatically or gas (typically air) driven actuator 80a is mounted and arranged to provide the user with control over the rate of flow of injection fluid through the nozzle channel 35a, exit port and gate 50a. The valve pin 45a is controllably drivable via attachment or interconnection to the controllably drivable piston 70a of the actuator 80a.

In the FIG. 9 embodiment, the piston 70a is mounted in a gas sealed cylinder 85a for controllable reciprocal upstream and downstream X movement of the piston 70a within the cylinder and, a fortiori, of the valve pin 45a within the channel 35a of the nozzle 30a. The movement X of the piston 70a and its interconnected valve pin 45a is remotely controllable via a remotely controllable valve system 90a that is comprised of a pair of remotely adjustable flow control or metering valves 92a, 94a that are respectively sealably interconnected between the flow ports 82a, 84a of the upper 102a and lower 104a gas drive chambers formed within the cylinder 85a by the piston 70a. The valves 92a, 94a are connected to a remotely located controller 110a that contains a program that is programmable by a user to carry out instructions that instruct the valves 92, 94 to operate to enable gas flow to and from the drive chambers 102a, 104a at controlled flow rates (typically reduced relative to maximum) to drive the piston 70 and associated valve pin 45a at preselected velocities as the tip end of the valve pin is driven between a fully closed downstream position FC, a fully open upstream position FO and one or more intermediate upstream positions I. The metering valves 92a, 94a are drivable via a control signal sent by the controller to an electrical drive mechanism that inputs a predetermined amount of electrical power or energy to the drive mechanism for the valves 92a, 94a, the valves being driven to a degree of openness that is proportional to the amount or degree of electrical energy or power that is input by the electrical drive mechanism as instructed to be input by the program of the controller.

As shown the system is driven by a master source 120a of pressurized air, such as a pump or vacuum, that is sealably interconnected to the flow or metering control valves 92a, 94a through a directional flow valve 130a that is disposed and interconnected between the air supply 120a and the metering valves 92a, 94a. The air supply 120a can supply a selected maximum gas (air) pressure to the system that defines a maximum velocity at which the piston 70a and valve pin 45a can be driven. The metering valves 92a, 94a are controllably adjustable to meter the maximum rate of flow of gas that flows to and from the directional valve 130a such that the maximum rate of gas flow that flows to and from the drive chambers 102a, 104a is controllably reduced relative to the maximum rate of gas flow. The metering valves 92a, 94a are controllably adjustable to meter the gas flow rate to and from the drive chambers 102a, 104a over the course of movement of the valve pin 45a between the fully closed FC position and the fully open FO position via programming of the instructions contained in the controller 110a.

The directional valve 130a is remotely controllable via a control signal interconnection to the controller 110a or directly to a sensor such as an injection barrel screw or valve pin or actuator position or mold position sensor or the like that can send a signal to the directional valve 130a and instruct the valve 130a to move to either an upstream or downstream drive position as preselected by the user. As can be readily imagined the directional valve 130a controls the direction of flow of gas to or from the gas drive chambers 102a, 104a and the metering valves 92a, 94a so as to cause the piston 70a and valve to be driven in either an upstream or downstream direction at any preselected, pre-programmed time or position of the valve pin 45a or piston 70a.

Similarly, the metering valves 92a, 94a are controllably adjustable via interconnection to the controller 110a, to enable the user to control or adjust the degree of openness of the valves 92a, 94a which in turn controls or adjusts the rate of flow of pressurized gas into or out of the drive chambers 102a, 104a which in turn controls or adjusts the rate of travel or velocity of movement X of the valve pin 45a between the fully closed FC and fully open FO positions. Such programmable control of the degree of openness of the metering valves 92a, 94a can be programmed to vary to any desired degree over any portion or all of the stroke length L of the tip end of the valve pin 45a between the fully closed FC and fully open FO positions. The program that remotely instructs the movement of the metering valves 92a, 94a can be programmed to execute such instructions based on the position of the piston 70 (and a fortiori the valve pin 45a) as sensed by a position sensor 150a. Or the program can execute such instructions based on the input by the user of a predetermined elapse or amount of time as measured by a clock 160a input to the program of the controller 110a.

Figure 10:
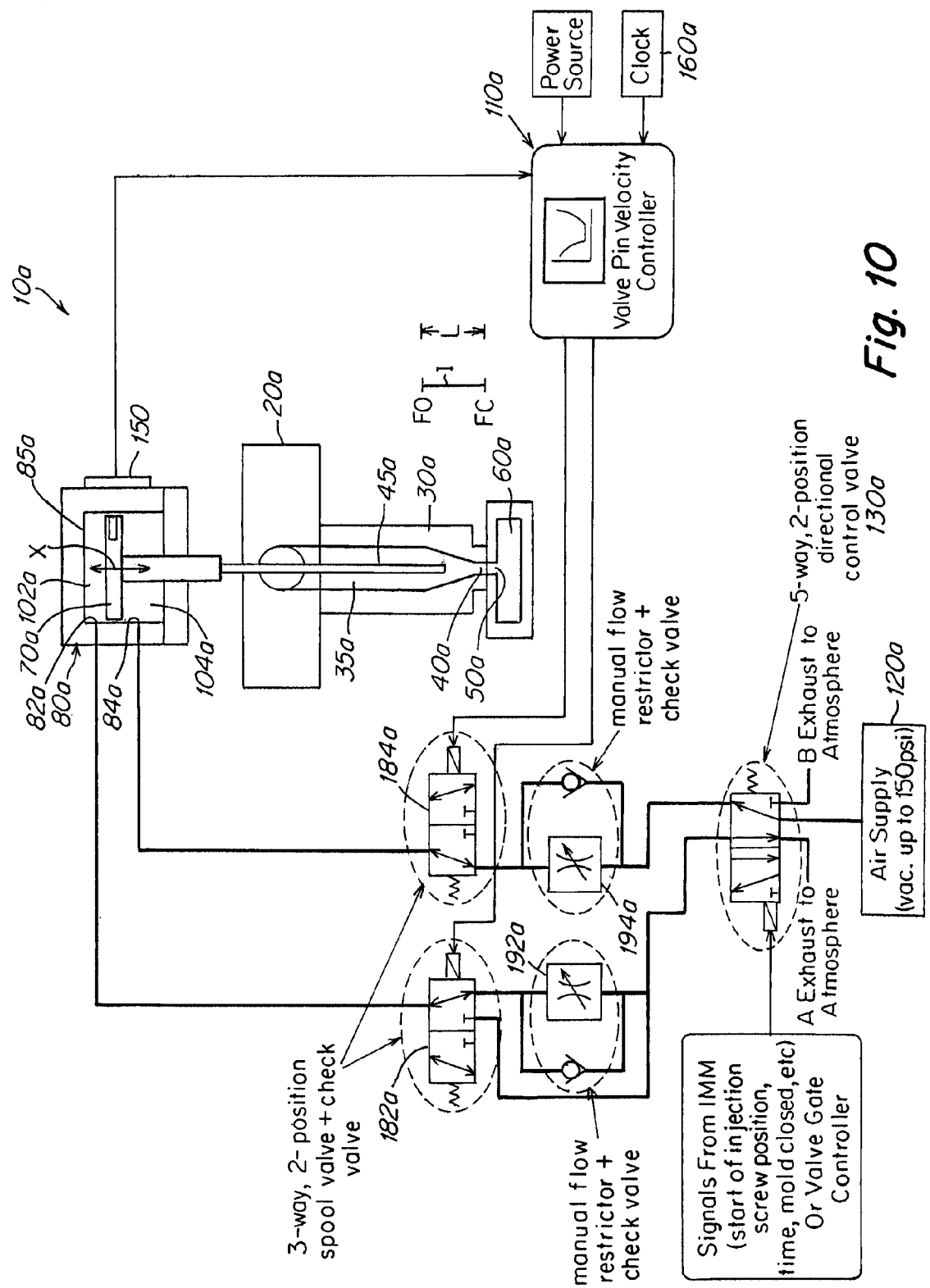
FIG. 10 is a schematic of an embodiment of the invention showing a pneumatically powered system injection molding system comprising a pair of manually adjustable gas metering valves interconnected respectively between the flow ports of the upper and lower gas drive chambers of a pneumatic actuator and a master source of pressurized gas, typically air, that drives the system, the system including a pair of bypass valves also interconnected between the flow ports and master source of pressurized gas, the bypass valves being remotely controllable to bypass flow through the metering valves.

In the FIG. 10 embodiment the system 10a utilizes a manually adjustable pair of metering or flow control valves 192a, 194a in place of the remotely electrically or electronically adjustable valves 92a, 94a of the FIG. 1 embodiment. And, the system 10a includes a respective pair of bypass valves 182a, 184a disposed in the gas flow line between the manually adjustable valves 192a, 194a and the drive chamber ports 82a, 84a. In the FIG. 10 embodiment, the user manually sets or adjusts the degree of openness of the valves 192a, 194a before beginning an injection cycle which in turn sets or adjusts the velocity of the piston 70a and pin 45a system to a single predetermined velocity. The single predetermined velocity as determined by the manual setting of metering valves 192a, 194a is enabled for any predetermined portion or or the entirety of the stroke length L by remote control of the bypass valves 182a, 184a which, when activated, bypass the metering valves 192a, 194a, and open the flow from the source 120a to the maximum gas drive flow rate and, a fortiori, the drive of the piston 70a at the maximum velocity. The bypass valves are remotely adjustable by interconnection to the controller 110a. Remotely controlled activation or deactivation of the bypass valves 182a, 184a is carried out by the user by programming the program in the controller 110a to activate or deactivate (fully open or fully close) the bypass valves 182a, 184a at any one or more predetermined times during the course of an injection cycle or at any predetermined times when the valve pin or piston is detected to be disposed in one or more predetermined positions as detected by the position sensor 150a and input to the controller 110a.

What is claimed is:

1. An injection molding apparatus for controlling velocity or volume of delivery of an injection fluid material to a cavity of a mold, the apparatus comprising:
    a pneumatically driven actuator comprising a fluid sealed chamber in which a piston is mounted, the piston being interconnected to a valve pin,
    the piston forming first and second drive chambers within the fluid sealed chamber, each drive chamber having respective fluid flow ports, the piston and valve pin being drivable along a reciprocal path of axial travel having a stroke length that extends between a fully upstream gate open position where injection fluid material is enabled through a gate to a mold and a fully downstream gate closed position where the pin stops flow of injection material through the gate to the mold,
    a source of pressurized gas that generates gas flow at a selected maximum pressure or flow rate,
    a gas metering mechanism disposed between the source and one or the other or both of the fluid flow ports of the drive chambers, the gas metering mechanism being controllably movable to one or more selectable positions that vary rate of flow or pressure of the pressurized gas through one or the other of the fluid flow ports to one or more corresponding reduced pressures or reduced flow rates of the pressurized gas that are less than the maximum pressure or flow rate,
    a controller that includes programmable instructions that:
    automatically controllably move the gas metering mechanism to one or more of the selectable positions that correspond to reduced pressures or reduced flow rates during the course of at least a selected portion of the stroke length from the fully downstream gate closed position to the fully upstream gate open position and,
    automatically controllably move the gas metering mechanism to one or more of the selectable positions that correspond to reduced pressures or reduced flow rates during the course of at least a selected portion of the stroke length from the fully upstream gate open position to the fully downstream gate closed position
    wherein the gas metering mechanism comprises one or more shutters or adjustable aperture devices that are mounted on or to or are integral with the actuator and are adjustable to one or more selectable positions that controllably vary the degree of openness of the fluid flow ports,
    wherein the one or more shutters or adjustable aperture devices are interconnected to one or more electric motors which are interconnected to the controller and controllable to selectively adjust the shutters or adjustable aperture devices to the one or more selectable positions that correspond to reduced pressures or reduced flow rates during the course of at least a selected portion of the stroke length from the fully downstream gate closed position to the fully upstream gate open position.

2. An injection molding apparatus for controlling velocity or volume of delivery of an injection fluid material to a cavity of a mold, the apparatus comprising:
    a pneumatically driven actuator comprising a fluid sealed chamber in which a piston is mounted, the piston being interconnected to a valve pin,
    the piston forming first and second drive chambers within the fluid sealed chamber, each drive chamber having respective fluid flow ports piston and valve pin being drivable along a reciprocal path of axial travel having a stroke length that extends between a fully upstream gate open position where injection fluid material is enabled through a gate to a mold and a fully downstream gate closed position where the pin stops flow of injection material through the gate to the mold,
    a source of pressurized gas that generates gas flow at a selected maximum pressure or flow rate,
    a gas metering mechanism interconnected between the source and one or the other or both of the fluid flow ports of the drive chambers, the gas metering mechanism being controllably movable to one or more selectable positions that vary rate of flow or pressure of the pressurized gas through one or the other of the fluid flow ports to one or more corresponding reduced pressures or reduced flow rates of the pressurized gas that are less than the maximum pressure or flow rate, wherein the gas metering mechanism comprises one or more shutters or adjustable aperture devices that are mounted on or to or are integral with the actuator and are adjustable to one or more selectable positions that controllably vary the degree of openness of the fluid flow ports, wherein the one or more shutters or adjustable aperture devices are interconnected to one or more electric motors which are interconnected to the controller and controllable to selectively adjust the shutters or adjustable aperture devices to the one or more selectable positions that correspond to reduced pressures or reduced flow rates during the course of at least a selected portion of the stroke length from the fully downstream gate closed position to the fully upstream gate open position that correspond to reduced pressures or reduced flow rates during the course of at least a selected portion of the stroke length from the fully downstream gate closed position to the fully upstream gate open position.

3. The apparatus of claim 2 wherein the control mechanism includes programmable instructions that controllably move the gas metering mechanism to the one or more selectable positions corresponding to reduced pressures or reduced flow rates during the course of at least a selected portion of the stroke length when the pin travels from the fully upstream gate open position to the fully downstream gate closed position.

4. The apparatus of claim 2 wherein the gas metering mechanism comprises a manually adjustable member that a user manually adjusts to a selectable position prior to initiation of an injection cycle, the manually adjustable member remaining in the selectable position throughout the injection cycle.

5. The apparatus of claim 2 wherein the gas metering mechanism is remotely controllable to move automatically to one or more of the selectable positions, the controller being programmable to automatically direct the gas metering mechanism to move to the one or more selectable positions to controllably adjust or vary the rate of flow or the degree of pressure of gas flowing through one or the other or both of the fluid flow ports according to a preselected algorithm or program.

6. The apparatus of claim 5 wherein the controller includes instructions that direct the rate of flow or degree of pressure of gas to vary according to the expiration or elapse of a preselected amount of time or according to a detected position of the actuator or pin by a position sensor.

7. The apparatus of claim 2 wherein the control mechanism is programmed to move the metering mechanism to one or more selected positions that reduce the flow rate or pressure of the gas flowing through one or the other of the fluid flow ports beginning at a time when the valve pin or actuator are in the fully gate closed position for an initial period of time or upstream travel distance where the actuator or pin travel upstream along a portion of the stroke length and wherein the flow rate or pressure of the gas is increased on expiration of the initial period such that the actuator or valve pin continues to travel upstream at a higher velocity on expiration of the initial period.

8. The apparatus of claim 2 wherein the metering mechanism comprises an electronically programmable flow restrictor.

9. A method of controllably adjusting rate of travel or velocity of a pneumatic actuator piston or valve pin associated with the piston during an injection cycle in an injection molding apparatus, wherein the actuator comprises a fluid sealed chamber in which the piston is mounted forming first and second fluid sealed drive chambers having respective first and second fluid flow ports, the piston being interconnected to the valve pin, the piston and valve pin being drivable along a reciprocal path of axial travel having a stroke length that extends between a fully upstream gate open position where injection fluid material is enabled to flow through a gate to a mold cavity and a fully downstream gate closed position where the pin stops flow of injection material through the gate to the mold cavity, the method comprising:

interconnecting a source of pressurized gas that generates gas flow at a selected maximum pressure or flow rate to the fluid flow ports, preselecting a start time at which and a duration over the course of which the flow of the pressurized gas from the source is to be metered through the fluid flow ports during the course of the injection cycle, metering the flow of pressurized gas from the source through the fluid flow ports at the preselected start time and for the selected duration at a rate of flow or pressure of the pressurized gas that is less than the maximum pressure or flow rate of the source, controllably operating a metering mechanism that comprises one or more shutters or adjustable aperture devices that are mounted on or to or are integral with the actuator and are adjustable to one or more selectable positions that controllably vary the degree of openness of the fluid flow ports, wherein the one or more shutters or adjustable aperture devices are interconnected to one or more electric motors which are interconnected to the controller and controllable to selectively adjust the shutters or adjustable aperture devices to the one or more selectable positions that correspond to reduced pressures or reduced flow rates during the course of at least a selected portion of the stroke length from the fully downstream gate closed position to the fully upstream gate open position.

10. The method of claim 9 wherein the step of metering further comprises metering the flow of pressurized gas beginning when the valve pin is in the fully downstream gate closed position at the beginning of the injection cycle when the piston or pin are first withdrawn upstream.

11. The method of claim 9 wherein the step of metering further comprises selecting the duration of metering such that the gas is metered over a period of time or over the course of an upstream pin travel distance that is less than the stroke length or less than an amount of time required for the piston or pin to travel upstream the entire stroke length.

12. A method of controllably adjusting rate of travel or velocity of the piston of the apparatus of claim 1 comprising operating the apparatus of claim 1 to:

automatically controllably move the gas metering mechanism to one or more of the selectable positions that correspond to reduced pressures or reduced flow rates during the course of at least a selected portion of the stroke length from the fully downstream gate closed position to the fully upstream gate open position and, automatically controllably move the gas metering mechanism to one or more of the selectable positions that correspond to reduced pressures or reduced flow rates during the course of at least a selected portion of the stroke length from the fully upstream gate open position to the fully downstream gate closed position.

13. A method of controllably adjusting rate of travel or velocity of the piston of the apparatus of claim 2 comprising operating the apparatus of claim 2 to selectively adjust the shutters or adjustable aperture devices to the one or more selectable positions that correspond to reduced pressures or reduced flow rates during the course of at least a selected portion of the stroke length from the fully downstream gate closed position to the fully upstream gate open position.

* * * * *

UNITED STATES PATENT AND TRADEMARK OFFICE
CERTIFICATE OF CORRECTION

PATENT NO. : 9,662,820 B2  
APPLICATION NO. : 14/698144  
DATED : May 30, 2017  
INVENTOR(S) : Sergio Ribeiro de Oliveira Antunes et al.

Page 1 of 1

It is certified that error appears in the above-identified patent and that said Letters Patent is hereby corrected as shown below:

In the Claims

In Column 30, Line 50:
After the word "ports" insert -- , the --

In Column 31, Lines 16-19:
Delete "that correspond to reduced pressures or reduced flow rates during the course of at least a selected portion of the stroke length from the fully downstream gate closed position to the follow upstream gate open position"

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*